US007852860B2

United States Patent
Aizu et al.

(10) Patent No.: US 7,852,860 B2
(45) Date of Patent: Dec. 14, 2010

(54) PROTOCOL CONVERSION APPARATUS, COMMUNICATION APPARATUS, METHOD AND PROGRAM

(75) Inventors: Hiroyuki Aizu, Yokohama (JP); Keiichi Teramoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 976 days.

(21) Appl. No.: 11/360,992

(22) Filed: Feb. 24, 2006

(65) Prior Publication Data

US 2006/0195613 A1    Aug. 31, 2006

(30) Foreign Application Priority Data

Feb. 25, 2005    (JP) .............................. 2005-051237

(51) Int. Cl.
*H04L 12/28* (2006.01)
(52) U.S. Cl. ...................... 370/401; 370/252; 370/389; 370/395.5
(58) Field of Classification Search ................. 370/464, 370/465, 466, 252, 389, 401, 395.5; 709/230, 709/236
See application file for complete search history.

(56) References Cited

U.S. PATENT DOCUMENTS

| | | | |
|---|---|---|---|
| 6,963,925 | B1 | 11/2005 | Ishikawa et al. |
| 2003/0115327 | A1* | 6/2003 | Kokado et al. .............. 709/225 |
| 2003/0158629 | A1* | 8/2003 | Matsuoka et al. ........... 700/245 |
| 2004/0146057 | A1* | 7/2004 | Yi et al. ...................... 370/401 |
| 2005/0018696 | A1* | 1/2005 | Henry ......................... 370/401 |
| 2005/0060419 | A1* | 3/2005 | Fujii et al. ................... 709/230 |
| 2005/0169287 | A1* | 8/2005 | Krusche et al. ............. 370/401 |
| 2005/0172056 | A1* | 8/2005 | Ahn ............................ 710/72 |
| 2005/0210155 | A1* | 9/2005 | Oeda et al. .................. 709/249 |
| 2005/0267655 | A1* | 12/2005 | Gessner ....................... 701/29 |

FOREIGN PATENT DOCUMENTS

| | | |
|---|---|---|
| JP | 10-308786 | 11/1998 |
| JP | 2001-007861 | 1/2001 |
| JP | 2003-8610 | 1/2003 |

OTHER PUBLICATIONS

Office Action dated May 27, 2008 in Japanese Application No. 2005-051237 and English-language translation thereof.

* cited by examiner

*Primary Examiner*—Ricky Ngo
*Assistant Examiner*—DeWanda Samuel
(74) *Attorney, Agent, or Firm*—Nixon & Vanderhye, PC

(57) ABSTRACT

There is provided with a protocol conversion apparatus including: a database unit which stores service descriptions, each describing at least one service in accordance with specification of a first protocol, and conversion rule descriptions each describing at least one protocol conversion rule; a database retrieval unit which retrieves from the database unit a service description and a conversion rule description; a virtual processing unit which conducts processing of behaving as if providing the service described in the retrieved service description; a conversion unit which converts an access request to the service to an access request of a second protocol, on the basis of a protocol conversion rule associated with the service; and an access request transmission unit which transmits the converted access request.

11 Claims, 21 Drawing Sheets

```xml
<?xml version="1.0"?>
<root xmlns="urn:schemas-upnp-org:device-1-0" >
  <specVersion>
    <major>1</major>
    <minor>0</minor>
  </specVersion>
  <device>
    <deviceType>urn:schemas-toshiba-co-jp:upnp-echonet:1</deviceType>
    <friendlyName>UPnP-ECHONET gateway</friendlyName>
    <manufacturer>TOSHIBA</manufacturer>
    <manufacturerURL>http://www.toshiba.co.jp/</manufacturerURL>
    <modelDescription/>
    <UDN>uuid:upnp-echonet-00:11:22:33:44:55</UDN>
    <serviceList>
      <service>
        <serviceType>urn:schemas-toshiba-co-jp:service:echonet::1</serviceType>
        <serviceId>urn:toshiba-co-jp:serviceId:ECHONET_1_0</serviceId>
        <controlURL>/control</controlURL>
        <SCPDURL>/SCPD.xml</SCPDURL>
      </service>
    </serviceList>
  </device>
</root>
```

FIG. 3

```xml
<?xml version="1.0" ?>
<scpd xmlns="urn:schemas-upnp-org:device-1-0" >
    <specVersion>
        <major>1</major>
        <minor>0</minor>
    </specVersion>
    <actionList>
        <action>
            <name>SetMode</name>
            <argumentList>
                <argument>
                    <name>newMode</name>
                    <relatedStateVariable>A_ARG_TYPE_Mode</relatedStateVariable>
                    <direction>in</direction>
                </argument>
            </argumentList>
        </action>
    </actionList>
    <serviceStateTable>
        <stateVariable sendEvents=no>
            <name>A_ARG_TYPE_Mode</name>
            <type>string</type>
            <allowedValueList>
                <allowedValue>auto</allowedValue>
                <allowedValue>heating<allowedValue>
                <allowedValue>cooling</allowedValue>
            </allowedValueList>
        </serviceStateTable>
</scpd>
```

FIG. 4

CONTROL INSTRUCTION DESCRIPTION EXAMPLE

```
<action>
  <name>SetMode</name>
  <argumentList>
    <argument>
      <name>newMode</name>
      <relatedStateVariable>A_ARG_TYPE_Mode</relatedStateVariable>
      <direction>in</direction>
    </argument>
  </argumentList>
  <UPnP_ECHONET_mapList>
    <ECHONET_REQUEST_ESV>0x61</ECHONET_REQUEST_ESV>
    <ECHONET_REPLY_ESV>0x71</ECHONET_REPLY_ESV>
    <ECHONET_EPC>0xB0</ECHONET_EPC>
  </UPnP_ECHONET_mapList>
</action>
```

FIG. 6

CONTROL DATA DESCRIPTION EXAMPLE

```
<stateVariable>
  <name>A_ARG_TYPE_Mode</name>
  <type>string</type>
  <allowedValueList>
    <allowedValue>auto</allowedValue>
    <allowedValue>heating</allowedValue>
    <allowedValue>cooling</allowedValue>
  </allowedValueList>
  <UPnP_ECHONET_mapList>
    <map>
      <allowedValue>auto</allowedValue><ECHONET_DATA>0x41</ECHONET_DATA>
    </map>
    <map>
      <allowedValue>heating</allowedValue><ECHONET_DATA>0x42</ECHONET_DATA>
    </map>
    <map>
      <allowedValue>cooling</allowedValue><ECHONET_DATA>0x43</ECHONET_DATA>
    </map>
  <UPnP_ECHONET_mapList>
</stateVariable>
```

FIG. 7

PROTOCOL CONVERSION APPARATUS, COMMUNICATION APPARATUS, METHOD AND PROGRAM

CROSS-REFERENCE TO RELATED APPLICATIONS

This application claims the benefit of priority under 35USC §119 to Japanese Patent Application No. 2005-51237 filed on Feb. 25, 2005, the entire contents of which are incorporated herein by reference.

BACKGROUND OF THE INVENTION

1. Field of the Invention

The present invention relates to a protocol conversion apparatus, a communication apparatus, a method and a program.

2. Related Art

As the network techniques spread in recent years, it has become possible to control home electric appliances through the network and acquire information from home electric appliances.

When conducting appliance control, a transmitting device and a receiving device need to use the same communication protocol to exchange control instructions and control data.

As to the communication protocol, there are a plurality of standards.

The ECHONET is standards mainly intended for white-colored home electric appliances, such as refrigerators, washing machines, electronic ovens and air conditioners, and sensors. The ECHONET determines the communication protocol, control instructions, and control data.

The UPnP basically determines the communication protocol, and control instructions and control data are determined every business world. For example, UPnP-IGD is determined for home router setting, and UPnP-AV is determined for AV device control.

If there are a plurality of protocols when constructing service, an application and a system in which devices present on a home network are collectively controlled, it is necessary to handle respective protocols. In this case, the application design becomes difficult because of model difference in protocols.

Furthermore, in actual programs as well, necessary modules corresponding to the protocols increase, and consequently the program becomes complicated. In addition, required computer resources (memories and CPU processing capabilities) also increase, resulting in an increased cost.

As for a solution to the complication caused by using a plurality of protocols, it can be solved by unifying a plurality of present protocols into one protocol. For example, systems of communication protocols, control instructions and control data defined by UPnP are highly flexible. Therefore, by converting other protocols to the UPnP protocol, they can be unified to the UPnP protocol. At this time, kinds and functions of home electric appliances are diversified, and there are also functions unique to manufactures. Therefore, it is necessary to prepare conversion rules for control instructions and control data between protocols every type and model of home electric appliance products.

In the conventional technique, the protocol conversion processing is fixedly generated as a program, and conducted in a protocol conversion apparatus (gateway). A method for conducting protocol conversion between the UPnP protocol and the IEEE 1394 protocol is disclosed in Japanese Patent Application Laid-Open No. 2003-8610. Therein, means for conducting the protocol conversion processing is fixedly incorporated in an apparatus.

With the advancement of home electric appliance development for improving the convenience for the users, addition of new functions which have not been present until then to home electric appliance products caused by development and appearance of new products, and resultant new addition of control instructions and control data to communication protocols, it becomes impossible for a conventional gateway that conducts fixedly programmed protocol conversion processing to cope the addition of the new control instructions and control data. Even if the program in the gateway is updated or new programs are added to the gateway, it takes long time to create the programs.

SUMMARY OF THE INVENTION

According to an aspect of the present invention, there is provided a protocol conversion apparatus for mediating access from a first communication device executing a first protocol on a first network to a second communication device executing a second protocol on a second network, comprising: a first protocol processing unit configured to execute the first protocol; a second protocol processing unit configured to execute the second protocol; a database unit configured to store service descriptions, each describing at least one service provided by a second communication device on the second network in accordance with specification of the first protocol, and to store conversion rule descriptions, each describing at least one protocol conversion rule to the second protocol associated with the at least one service; a detection unit configured to detect a second communication device on the second network; a database retrieval unit configured to retrieve from the database unit a service description and a conversion rule description to be used for the detected second communication device; a virtual processing unit configured to conduct processing of behaving as if providing a first communication device on the first network with the at least one service described in the retrieved service description, by using the first protocol processing unit, and to receive an access request to the service from the first communication device on the first network; a conversion unit configured to convert the access request received by the virtual processing unit to an access request of the second protocol, on the basis of a protocol conversion rule associated with the service described in the retrieved conversion rule description; and an access request transmission unit configured to transmit the converted access request to the detected second communication device on the second network.

According to an aspect of the present invention, there is provided A communication apparatus accessed via a network by an access apparatus executing a first protocol, the communication apparatus comprising: a communication unit; and a gateway unit configured to communicate with the communication unit in accordance with a second protocol, and mediates access from the access apparatus to the communication unit, wherein the gateway unit includes: a first protocol processing portion configured to execute the first protocol; a second protocol processing portion configured to execute the second protocol; a data storage portion configured to store a service description describing at least one service provided by the communication unit in accordance with specification of the first protocol, and a conversion rule description describing at least one protocol conversion rule to the second protocol associated with the at least one service; a virtual processing portion configured to conduct processing of behaving as if providing the access apparatus with the at least one service described in the service description, by using the first protocol processing portion, and to receive an access request to the service from the access apparatus on the first network; a conversion portion configured to convert the access request received by the virtual processing portion to an access request of the second protocol on the basis of the protocol conversion rule associated with the service; and a transmitting portion configured to transmit the converted access request to the communication unit.

According to an aspect of the present invention, there is provided A method executed in an apparatus which mediates access from a first communication device executing a first protocol on a first network to a second communication device executing a second protocol on a second network, comprising: detecting a second communication device on the second network; conducting retrieval in a database unit which stores service descriptions, each describing at least one service provided by a second communication device on the second network in accordance with specification of the first protocol and stores conversion rule descriptions, each describing at least one protocol conversion rule to the second protocol associated with the at least one service, and acquiring a service description and a conversion rule description to be used for the detected second communication device; conducting processing of behaving in accordance with the first protocol as if providing the first communication device on the first network with the at least one service described in the acquired service description; upon receiving an access request to the service from the first communication device on the first network, converting the received access request to an access request of the second protocol on the basis of the protocol conversion rule associated with the service described in retrieved conversion rule description; and transmitting the converted access request to the detected second communication device on the second network.

According to an aspect of the present invention, there is provided A program for inducing an apparatus which mediates access from a first communication device executing a first protocol on a first network to a second communication device executing a second protocol on a second network to execute: detecting a second communication device on the second network; conducting retrieval in a database unit which stores service descriptions, each describing at least one service provided by a second communication device on the second network in accordance with specification of the first protocol and stores conversion rule descriptions, each describing at least one protocol conversion rule to the second protocol associated with the at least one service, and acquiring a service description and a conversion rule description to be used for the detected second communication device; conducting processing of behaving in accordance with the first protocol as if providing the first communication device on the first network with the at least one service described in the acquired service description; upon receiving an access request to the service from the first communication device on the first network, converting the received access request to an access request of the second protocol on the basis of the protocol conversion rule associated with the service described in retrieved conversion rule description; and transmitting the converted access request to the detected second communication device on the second network.

BRIEF DESCRIPTION OF THE DRAWINGS

FIG. 3 shows an example of a UPnP device description;

FIG. 4 shows an example of a UPnP service description;

FIG. 6 is a diagram showing an example of an inter-protocol conversion rule description for a control instruction description;

FIG. 7 is a diagram showing an example of an inter-protocol conversion rule description for control data;

DETAILED DESCRIPTION OF THE EMBODIMENTS

First Embodiment

Figure 1:
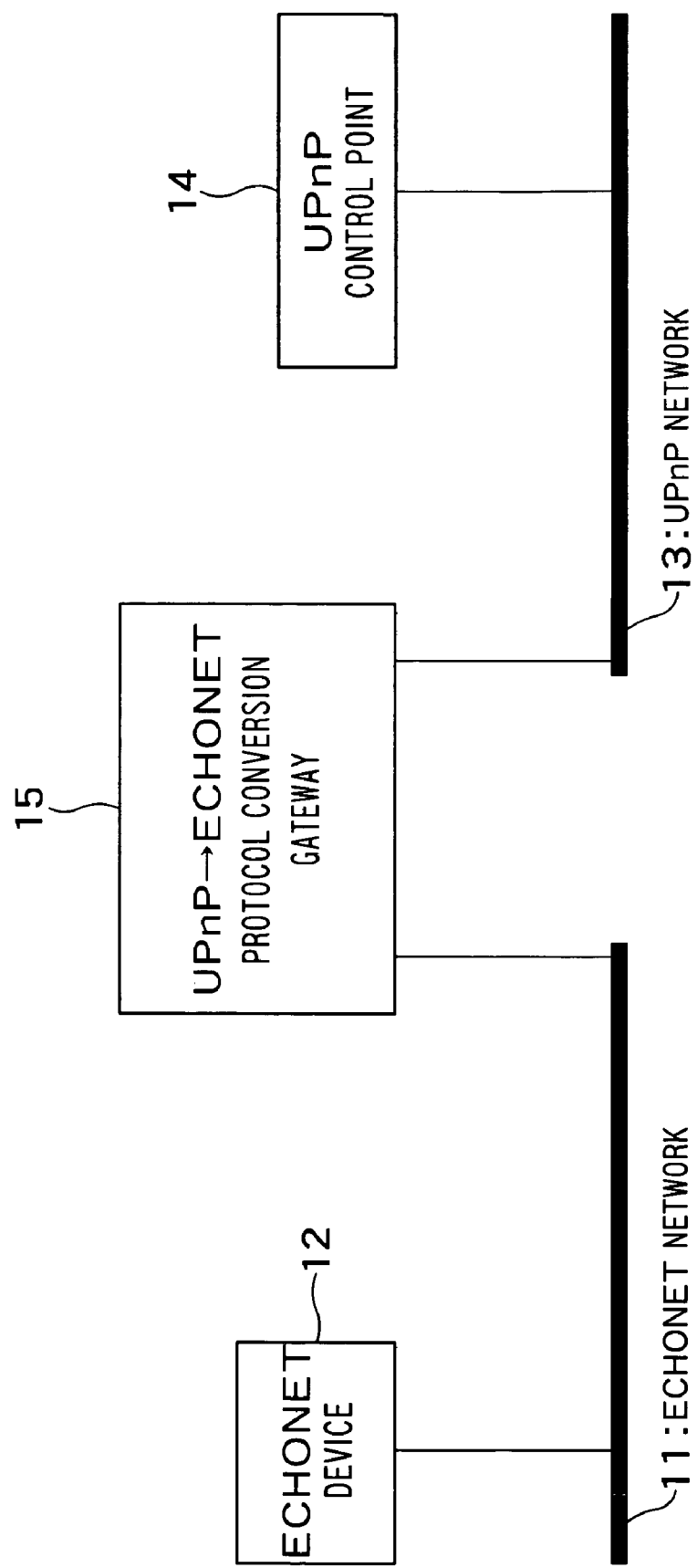
FIG. 1 is a diagram showing an overall configuration of a network system including a UPnP→ECHONET protocol conversion gateway according to a first embodiment of the present invention.

FIG. 1 is a diagram showing an overall configuration of a network system including a UPnP→ECHONET protocol conversion gateway 15 according to the present embodiment.

In this network, it is attempted to control an ECHONET (registered trademark) device 12 via a gateway 15 from a UPnP control point 14. Hereafter, this network system will be described in detail.

An ECHONET device 12 is connected to an ECHONET network 11. The ECHONET device 12 is a white-colored home electric appliance, such as a refrigerator, a washing machine, an electronic oven or an air conditioner. According to ECHONET standards, ECHONET communication is conducted using, for example, indoor lamplight wire communication or infrared ray communication. Furthermore, the IP (Internet Protocol) is virtually regarded as a communication medium, and operation is possible on an IP communication layer as well. As a real communication medium under an IP layer, Bluetooth (registered trademark), Ethernet (registered trademark), a wireless LAN or the like is used. The ECHONET is used for indoor lamplight wire communication as well.

The UPnP control point 14 is connected to a UPnP network 13. The UPnP control point 14 is a control device which acquires information from a UPnP device and issues a control instruction to the UPnP device. The UPnP control point 14 is, for example, a television set. UPnP operates on, for example, the IP layer.

A UPnP→ECHONET protocol conversion gateway 15 (hereafter referred to simply as gateway 15) connects the UPnP network 13 to the ECHONET network 11. The gateway 15 converts a control instruction and control data according to the UPnP protocol received from the UPnP control point 14, to those according to an ECHONET protocol. Furthermore, the gateway 15 converts a response returned from the ECHONET device in response to the control instruction from the ECHONET protocol to the UPnP protocol, and delivers the converted response to the UPnP control point 14.

Figure 2:
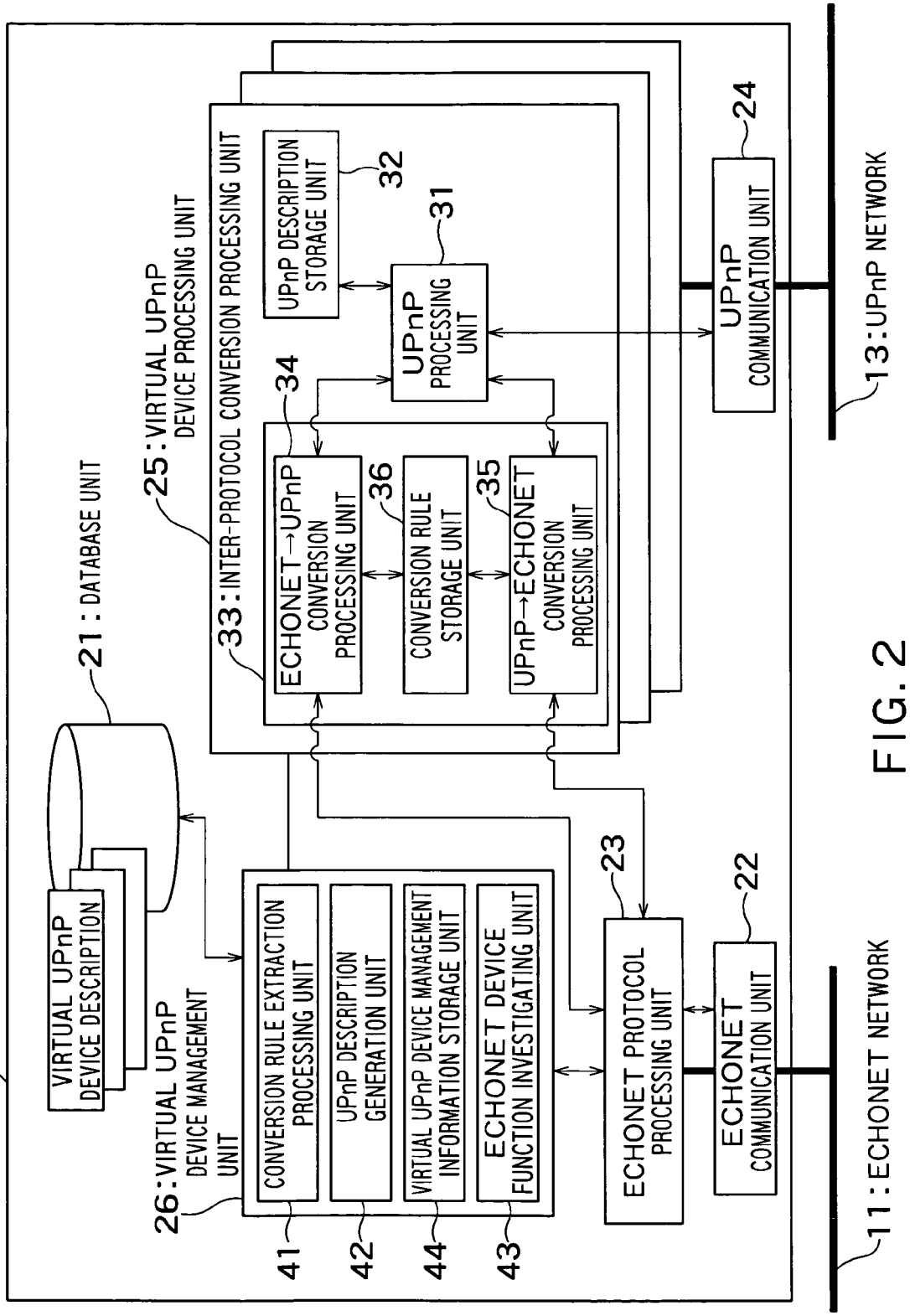
FIG. 2 is a block diagram showing an internal configuration of a UPnP→ECHONET protocol conversion gateway.

FIG. 2 is a block diagram showing an internal configuration of the gateway 15.

The gateway 15 includes a database unit 21 which stores virtual UPnP device descriptions, an ECHONET communication unit 22, an ECHONET protocol processing unit 23 which conducts ECHONET protocol processing, a UPnP communication unit 24, a virtual UPnP device processing unit 25 which conducts processing for making the ECHONET device look like a UPnP device, and a virtual UPnP device management unit 26 which manages a virtual UPnP device.

The virtual UPnP device processing unit 25 includes a UPnP processing unit 31, a UPnP description storage unit 32, and an inter-protocol conversion processing unit 33. The inter-protocol conversion processing unit 33 includes an ECHONET→UPnP conversion processing unit 34, a UPnP→ECHONET conversion processing unit 35, and a conversion rule storage unit 36.

The virtual UPnP device management unit 26 includes a conversion rule extraction processing unit 41, a UPnP description generation unit 42, an ECHONET device function investigating unit 43, and a virtual UPnP device management information storage unit 44.

Hereafter, the gateway 15 will be described in more detail.

First, the virtual UPnP device descriptions stored in the database unit 21 will be described.

According to UPnP standards, device information of the UPnP device is described as a UPnP device description by using the XML (extendable Markup Language) form. FIG. 3 shows an example of the UPnP device description.

In addition, service provided by the UPnP device, i.e., the control instruction and control data that can be accepted by the device are described as a UPnP service description by using the XML form. In the UPnP service description, the control instruction is described as action information and the control data is described as state Variable information.

FIG. 4 shows an example of the UPnP service description.

A portion surrounded by <actionList> and </actionList> is a description of a control instruction group. In the description, a portion surrounded by <action> and </action> is a description for an individual control instruction.

The control instruction is provided with a name by a character string ("SetMode") inserted between <name> and </name>. In a portion surrounded by <argument> and </argument>, control data used in the control instruction is described.

Typically, the UPnP device description and the UPnP service description are delivered from the UPnP device to the UPnP control point 14 in response to an acquisition request from the UPnP control point 14.

The UPnP control point 14 controls the device on the basis of the information described in the UPnP service description in accordance with the UPnP standards. In other words, the UPnP control point 14 issues a control instruction to the device.

In the ECHONET, the control instruction to the device is represented by two values: an ESV (ECHONET Service) code and EPC (ECHONET property code). 20 The value of the EPC becomes an identifier of a state variable of the ECHONET device. For example, if EPC=0×80, it is defined by the ECHONET standards that this represents a power supply state (ON/OFF) of a device. In each of various home electric appliances, a predetermined function is defined for each EPC value in the same way.

The ESV code represents an operation kind for the EPC. For example, ESV=0×61 indicates a write request to the EPC (a write request to a register) and ESV=0×71 indicates a response to the write request, according to the ECHONET standards.

The above-described virtual UPnP device description is obtained by adding a conversion rule between the UPnP protocol and the ECHONET protocol to each of the control instructions and control data in the UPnP service description by using unique identifiers.

Figure 5:
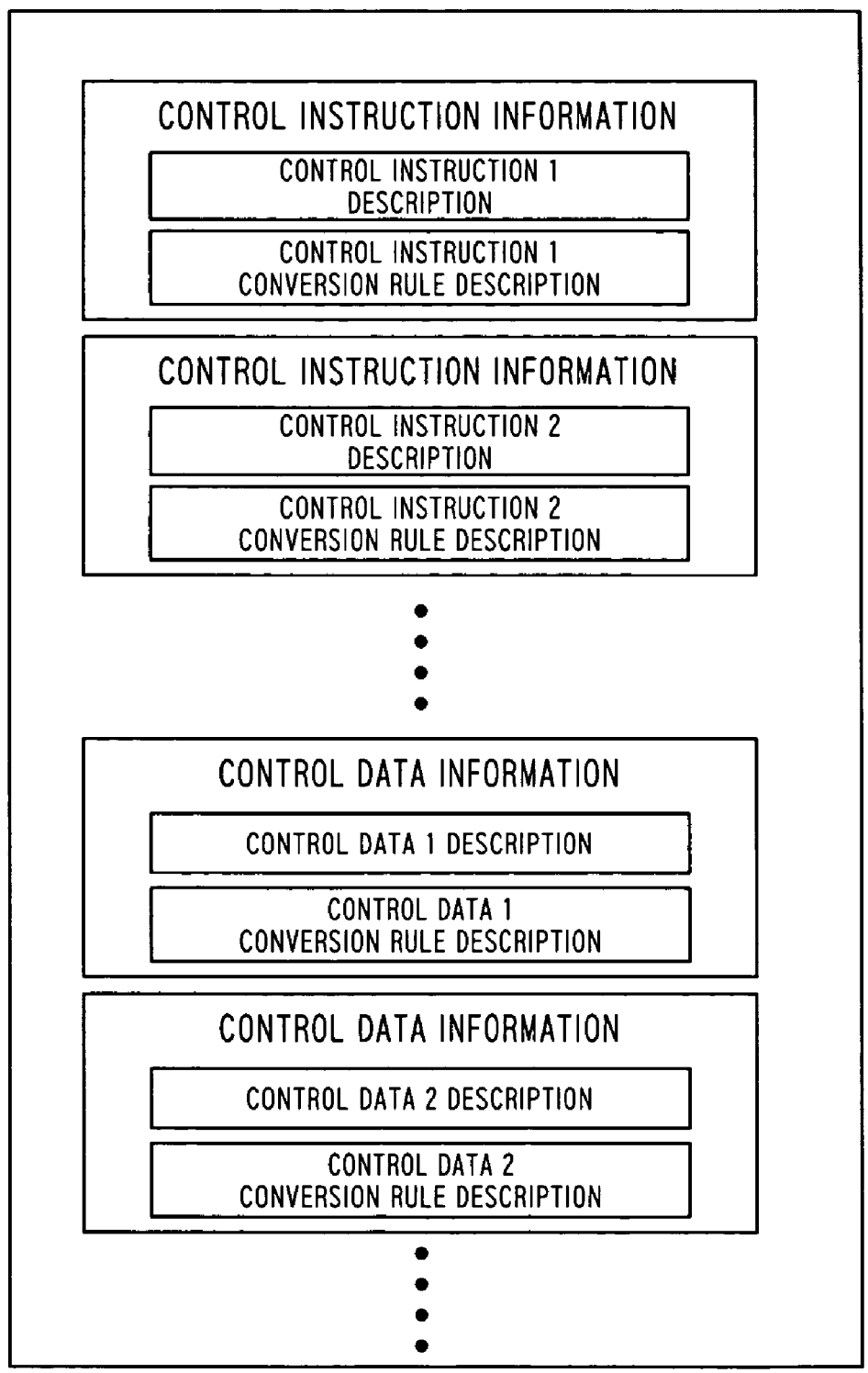
FIG. 5 is a diagram showing a schematic configuration of a virtual UPnP device description.

FIG. 5 is a diagram showing a schematic configuration of the virtual UPnP device description.

Each of control instruction descriptions and control data descriptions is provided with a control instruction conversion rule description and a control data conversion rule description.

FIG. 6 is a diagram showing an example of an inter-protocol conversion rule for a control instruction description. Specifically, FIG. 6 shows an example of a conversion rule description for a control instruction having a name "SetMode."

<UPnP_ECHONET_mapList> and </UPnP_ECHONET_mapList> correspond to the above-described unique identifiers, and an inter-protocol conversion rule is described in a region surrounded by them.

In this example, a portion surrounded by <ECHONET_REQUEST_ESV> and </ECHONET_REQUEST_ESV> represents that a UPnP control instruction "SetMode" is converted to an ESV code 0×61 (write request) in the ECHONET and the ESV code 0×61 is transmitted to an ECHONET device.

A portion surrounded by <ECHONET_REPLY_ESV> and </ECHONET_REPLY_ESV> represents that an ESV code 0×71 is returned from the ECHONET device in response to the control instruction (0×61 (write request)) transmitted to the ECHONET device.

A portion surrounded by <ECHONET_EPC> and </ECHONET_EPC> represents that 0×B0 is used as EPC (ECHONET property code).

FIG. 7 is a diagram showing an example of an inter-protocol conversion rule description for control data.

Even for a "Mode" variable used as control data of the "SetMode" instruction of the UPnP, a conversion rule is determined in a region surrounded by unique XML tags <UPnP_ECHONET_mapList> and </UPnP_ECHONET_mapList> in the same way as the UPnP control instruction.

If the variable in the UPnP is "auto" in this example, this "auto" is associated with a numerical value 0×41 in ECHONET. If the variables are "heating" and "cooling" in the UPnP, they are associated respectively with 0×42 and 0×43 in the ECHONET. An identifier such as the above-described UPnP_

ECHONET_mapList, i.e., the name of the XML tag is an example. Other character strings may also be used as long as they can be distinguished from other tags. Those character strings are determined when the present invention scheme is adopted in standards or products.

The virtual UPnP device descriptions (FIG. 5) heretofore described are prepared every device classification, manufacturer and model number of device, and stored in the database unit 21 so as to be associated with the UPnP device descriptions.

Referring back to FIG. 2, the ECHONET communication unit 22 is an apparatus for connecting the gateway 15 to the ECHONET network 11. For example, if standards are ECHONET IP standards, the ECHONET communication unit 22 is an IP communication unit. If standards are indoor lamplight wire standards, the ECHONET communication unit 22 is an indoor lamplight wire communication unit.

The ECHONET protocol processing unit 23 is a module that conducts communication with the ECHONET device 12 via the ECHONET communication unit 22 in accordance with the ECHONET protocol.

The ECHONET protocol processing unit 23 transmits a control instruction to the ECHONET device and receives a response from the ECHONET device, in accordance with a control request issued to the ECHONET device by the virtual UPnP device management unit 26 or the virtual UPnP device processing unit 25.

Upon detecting start of the ECHONET device on the ECHONET network 11, the ECHONET protocol processing unit 23 sends a notice of the detected ECHONET device to the virtual UPnP device management unit 26. When starting the gateway 15, the ECHONET protocol processing unit 23 investigates whether an ECHONET device started earlier than the gateway 15 is present on the ECHONET network 11. If there is an already started ECHONET device, the ECHONET protocol processing unit 23 sends a notice of the detected ECHONET device to the virtual UPnP device management unit 26.

Upon being notified of the start of the ECHONET device by the ECHONET protocol processing unit 23, the virtual UPnP device management unit 26 acquires detailed information of the device, here, the device classification, manufacturer, and model number from the detected ECHONET device via the ECHONET protocol processing unit 23. The device classification can be distinguished on the basis of an EOJ code (ECHONET object code) of an ECHONET object. The manufacturer and model number can be distinguished by acquiring the property of the ECHONET object. The virtual UPnP device management unit 26 utilizes the acquired information as a retrieval key candidate to be used when retrieving a virtual UPnP device description associated with the ECHONET device.

The virtual UPnP device management unit 26 determines whether the virtual UPnP device processing unit for the detected ECHONET device is already started by comparing the acquired detailed device information (the device classification, the manufacturer, and the model number) with information stored in the virtual UPnP device management information storage unit 44. Unless started, the virtual UPnP device management unit 26 starts the virtual UPnP device processing unit 25 (generates a process), and records the acquired detailed device information in the virtual UPnP device management information storage unit 44 so as to associate it with the started virtual UPnP device processing unit. Upon starting the virtual UPnP device processing unit 25, the virtual UPnP device management unit 26 passes a retrieval request containing the above-described detailed device information (retrieval key candidate) to the database unit 21.

The database unit 21 retrieves a virtual UPnP device description and a UPnP device description associated with this virtual UPnP device description on the basis of the device classification, the manufacturer and the model number contained in the received retrieval key candidate, and passes the retrieved virtual UPnP device description and the UPnP device description to the virtual UPnP device management unit 26. The installation place of the database unit 21 may be inside of the gateway 15 as in the present embodiment, or may be on a home network or the global Internet. In other words, the installation place of the database unit 21 may be anywhere as long as the gateway can access the database unit 21.

Figure 8:
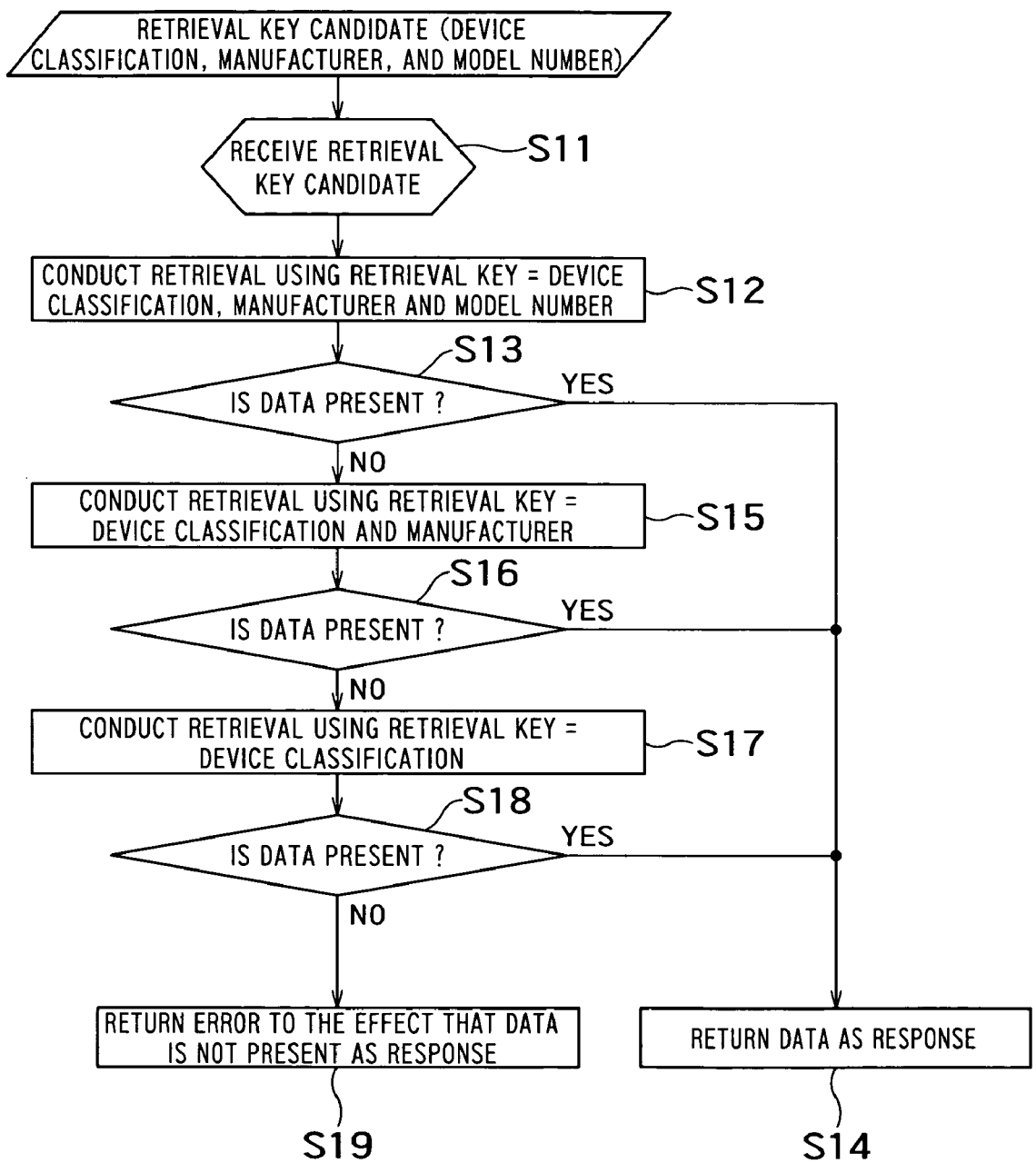
FIG. 8 is a flow chart showing an example of a retrieval procedure used by a database unit.

FIG. 8 is a flow chart showing an example of a retrieval procedure used by the database unit 21.

The database unit 21 receives a retrieval key candidate from the virtual UPnP device management unit 26 (S11). Here, the retrieval key candidate is a device classification, manufacturer and model number of the device.

First, retrieval is conducted using the whole retrieval key candidate as a retrieval key. In other words, retrieval is conducted using the device classification, manufacturer and model number as a retrieval key (S12).

If pertinent data (virtual UPnP device description and UPnP device description) is present (yes at S13), then the database unit 21 returns the data to the virtual UPnP device management unit 26 as a response (S14).

If the pertinent data is not present (no at S13), then the retrieval condition is relaxed and retrieval is conducted again. Specifically, retrieval is conducted again using the device classification and manufacturer included in the retrieval key candidate, as a retrieval key (S15).

If pertinent data is present (yes at S16), then the data is returned as a response (S14).

If pertinent data is not present (no at S16), the retrieval condition is further relaxed and retrieval is conducted again. Specifically, retrieval is conducted again using only the device classification included in the retrieval key candidate, as a retrieval key (S17).

If the pertinent data is present (yes at S18), the data is returned as a response (S14).

If the pertinent data is not present (no at S18), a response to the effect that the pertinent data is not present is returned as an error message (S19). In this case, the virtual UPnP device management unit 26 terminates the virtual UPnP device processing unit started some time ago (terminates the process), and deletes detailed device information associated with the virtual UPnP device processing unit from the virtual UPnP device management information storage unit 44.

Figure 9:
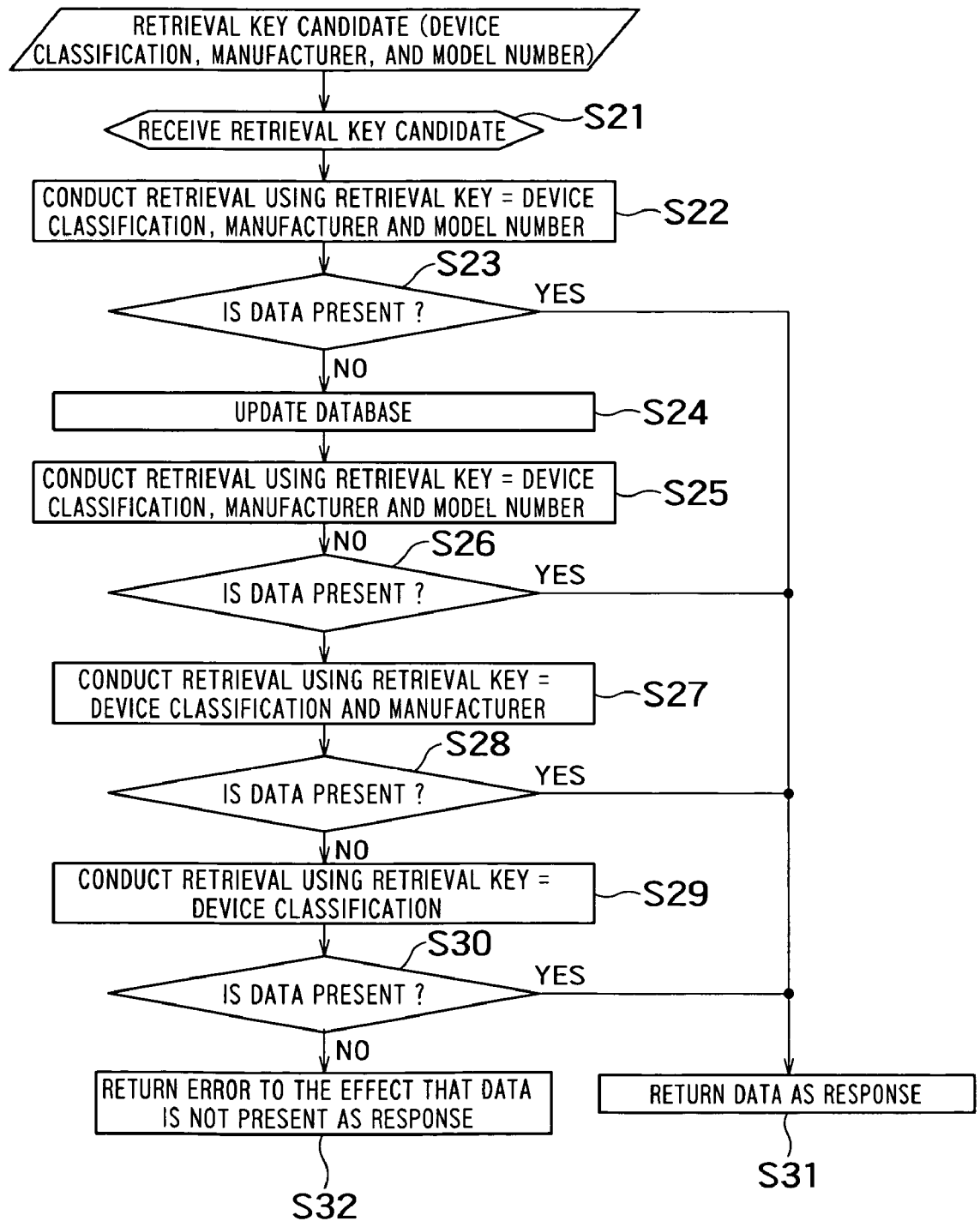
FIG. 9 is a flow chart showing an example of a retrieval procedure used by a database unit.

FIG. 9 shows another retrieval procedure different from that shown in FIG. 8.

Retrieval is conducted using the whole retrieval key candidate (the device classification, device manufacturer and model number) (S22). If pertinent data is not present (no at S23), the gateway 15 accesses a server prepared by the device manufacturer. The gateway 15 acquires information from the server, and updates the database unit 21 by using the acquired information (S24). Thereafter, the database unit 21 conducts retrieval using the whole retrieval key candidate as a retrieval key again (S25). Since the ensuing procedure S26 to S32 is conducted in the same way as FIG. 8, detailed description thereof will be omitted.

The retrieval procedure conducted by the database unit 21 will now be described with reference to a concrete example.

For example, it is now supposed that the ECHONET device is an air conditioner that is produced by "A" corporation and that is XYZ-001 in model number.

The virtual UPnP device management unit 26 determines device classification="air conditioner," manufacturer="A corporation," model number="XYZ-001" as a retrieval key candidate, and requests the database unit 21 to conduct the retrieval.

If the database unit 21 retains a virtual UPnP device description associated with an air conditioner of XYZ-001 type produced by "A" corporation, the database unit 21 returns the virtual UPnP device description to the virtual UPnP device management unit 26 which is the retrieval request source, together with the UPnP device description.

If the database unit 21 does not retain the pertinent virtual UPnP device description, the database unit 21 accesses the server of the device manufacturer, acquires information, and updates the database unit 21 by using the acquired information. Specifically, the database unit 21 updates at least some of the device classification, manufacturer, and model number associated with retained virtual UPnP device description(s). Or the database unit 21 adds new virtual UPnP device description and UPnP device description. Thereafter, the database unit 21 conducts the retrieval again.

If the pertinent virtual UPnP device description is not present even after the update, the database unit 21 narrows down the retrieval condition to device classification="air conditioner" and manufacturer="A corporation" and conducts retrieval again. In other words, the database unit 21 conducts retrieval of a virtual UPnP device description common to air conditioners produced by the A corporation.

If the pertinent virtual UPnP device description is present, the database unit 21 returns the virtual UPnP device description to the virtual UPnP device management unit 26.

If the pertinent virtual UPnP device description is not present, the database unit 21 conducts retrieval again by using device classification="air conditioner" as a retrieval key. In other words, the database unit 21 conducts retrieval for a virtual UPnP device description intended for air conditioners common to manufacturers. The database unit 21 returns a retrieval result to the virtual UPnP device management unit 26 which is the retrieval request source.

Referring back to FIG. 2, the ECHONET device function investigating unit 43 in the virtual UPnP device management unit 26 analyzes the virtual UPnP device description received from the database unit 21, and inspects whether the virtual UPnP device description is compatible with the detected ECHONET device. For example, the ECHONET device function investigating unit 43 in the virtual UPnP device management unit 26 investigates whether the detected ECHONET device actually conforms to the value of the EPC (ECHONET property) described in the control instruction conversion rule in the virtual UPnP device description.

Figure 10:
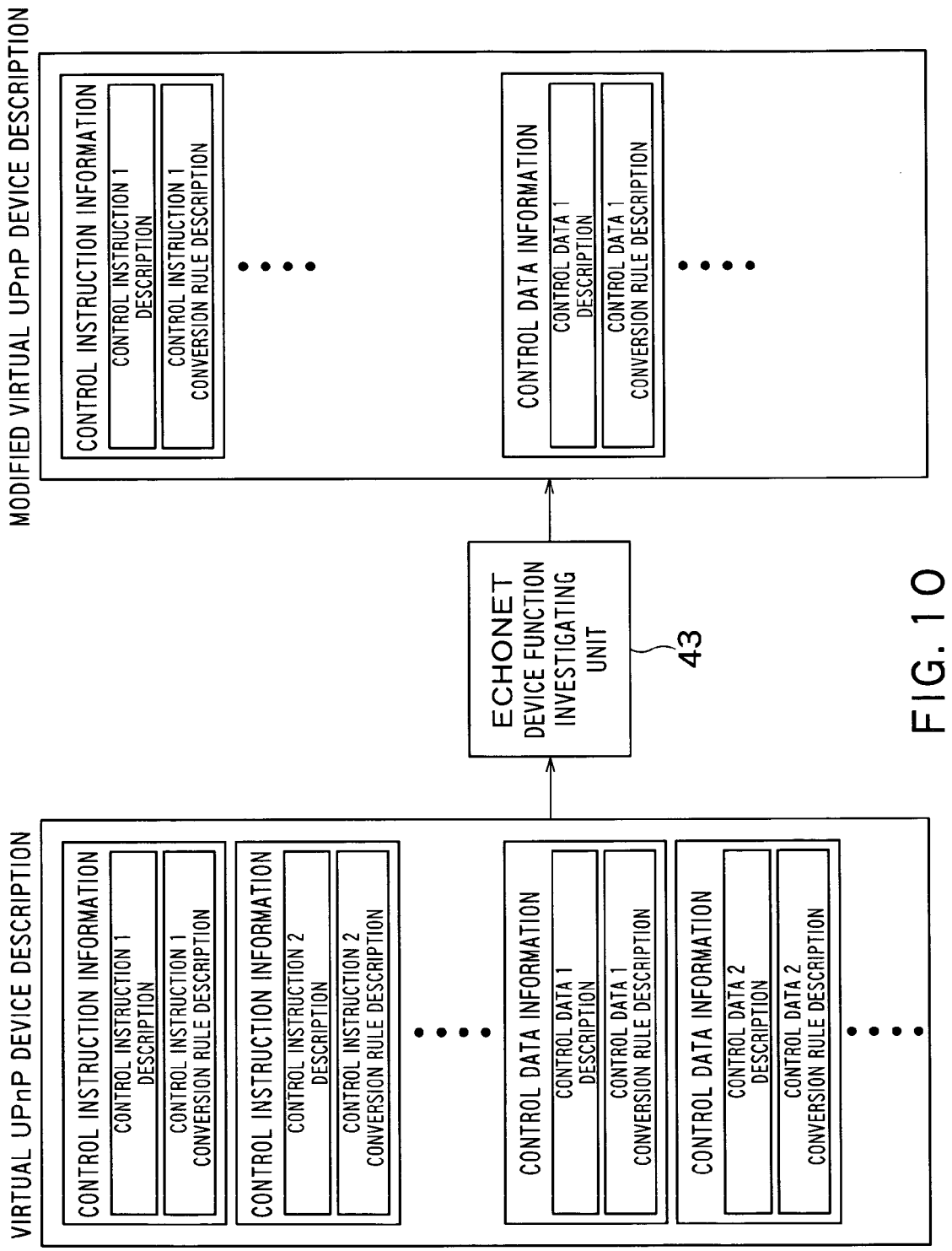
FIG. 10 shows an example of deletion of a control instruction description from a virtual UPnP device description.

Specifically, the ECHONET device function investigating unit 43 acquires an ECHONET property map from the ECHONET device, and inspects whether the ECHONET property contained in the virtual UPnP device description is contained in the ECHONET property map acquired from the ECHONET device. Unless contained, the ECHONET device function investigating unit 43 judges that the function associated with the ECHONET property is not present in the ECHONET device, and deletes control instruction information (control instruction description and control instruction conversion rule description) containing this ECHONET property and control data information (control data description and control data conversion rule description) associated with the control instruction information from the virtual UPnP device description. An example of deletion of the control instruction information and control data information from the virtual UPnP device description is shown in FIG. 10. This virtual UPnP device description subjected to the processing conducted by the ECHONET device function investigating unit 43 is referred to as modified virtual UPnP device description.

Figure 11:
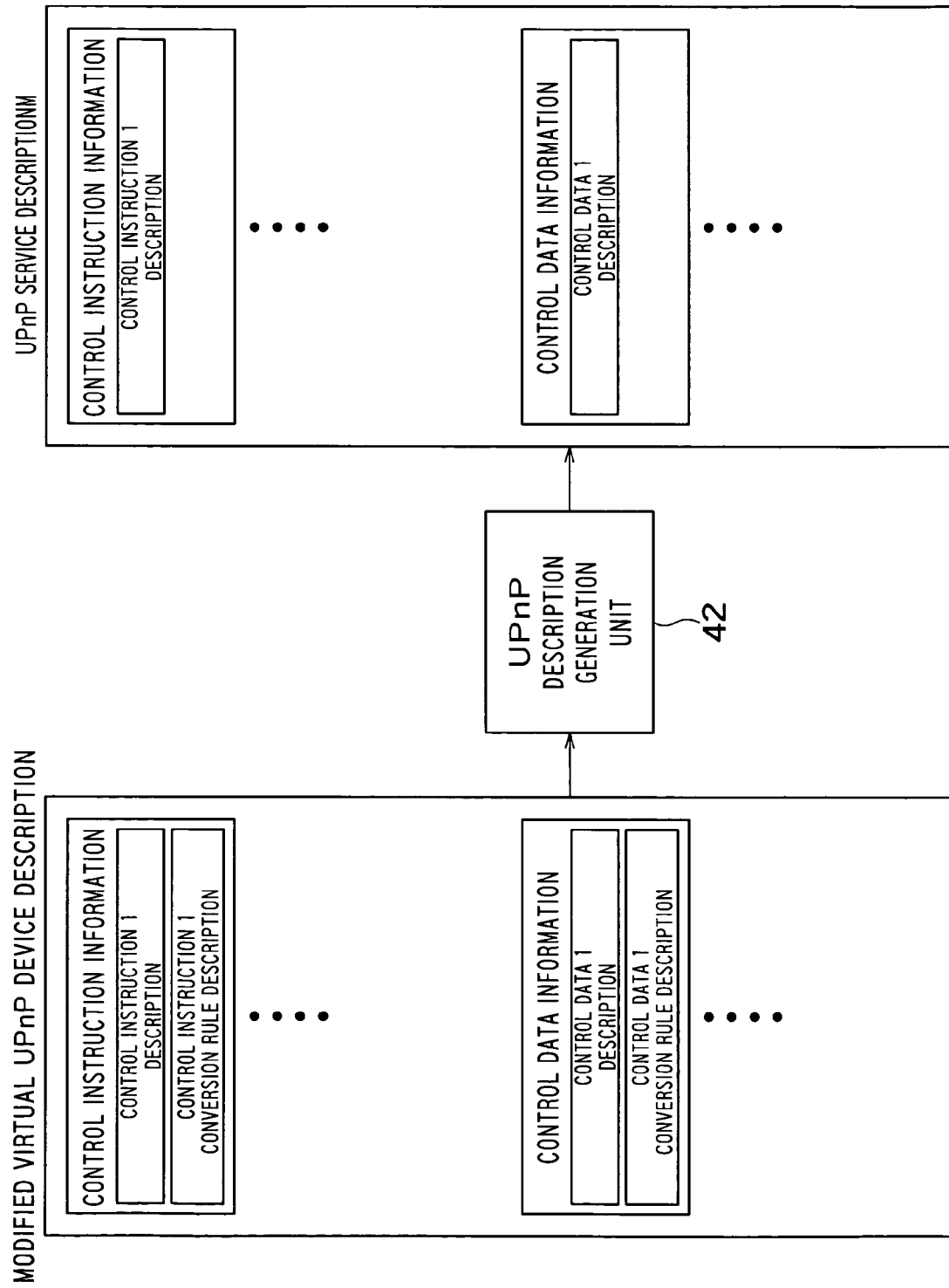
FIG. 11 shows an example of generation of a UPnP service description from a modified virtual UPnP device description.

The UPnP description generation unit 42 in the virtual UPnP device management unit 26 removes the control instruction conversion rule description and the control data conversion rule description from the modified virtual UPnP device description, and generates a UPnP service description. This processing is shown in FIG. 11.

The virtual UPnP device processing unit 25 receives the generated UPnP service description and the UPnP device description associated therewith from the virtual UPnP device management unit 26, and stores them in the UPnP description storage unit 32.

Figure 12:
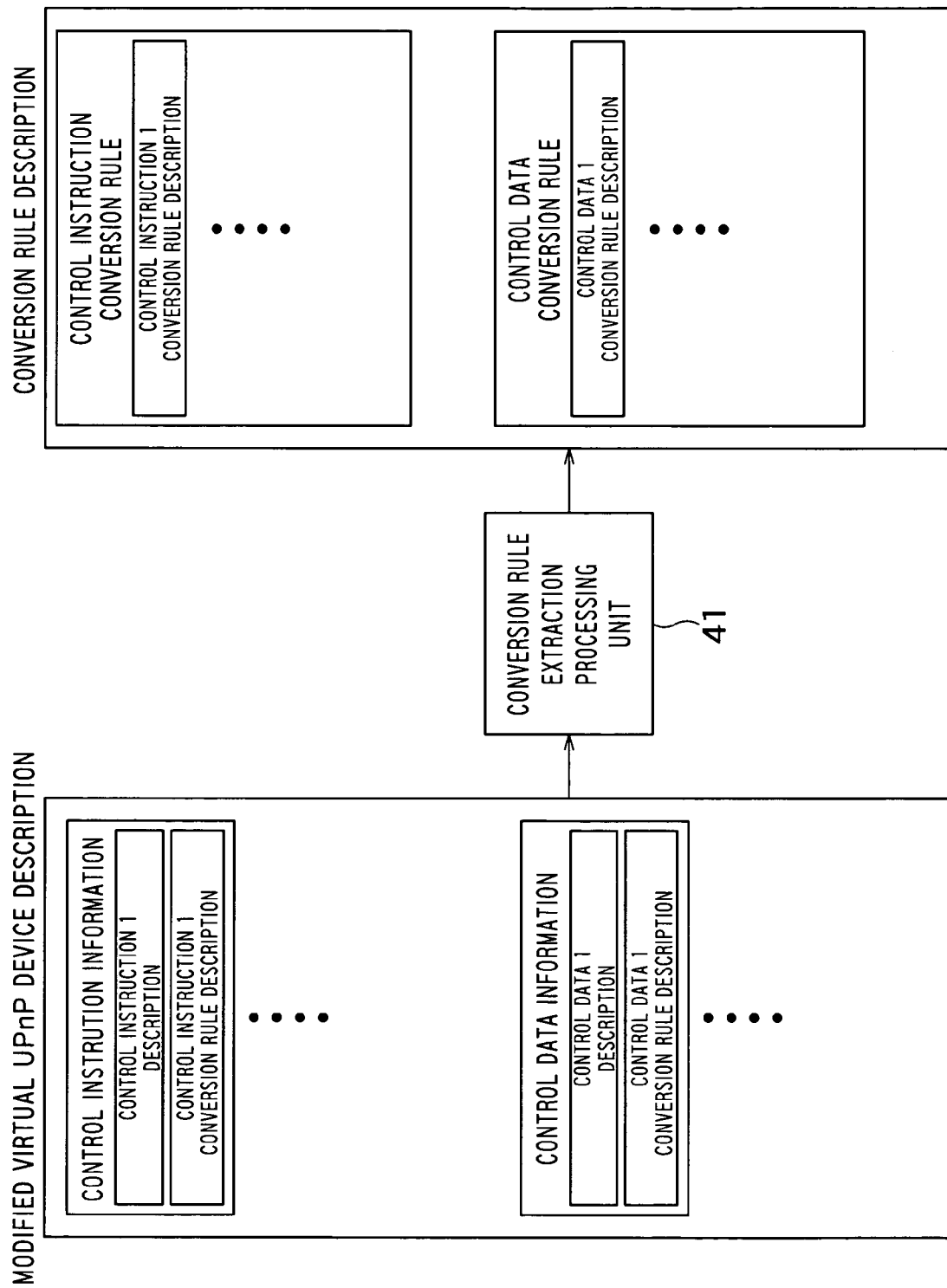
FIG. 12 shows a control instruction conversion rule description and a control data conversion rule description extracted from a modified virtual UPnP device description.

On the other hand, the conversion rule extraction processing unit 41 in the virtual UPnP device management unit 26 extracts the control instruction conversion rule description and the control data conversion rule description from the modified virtual UPnP device description. This processing is shown in FIG. 12.

The virtual UPnP device processing unit 25 receives the extracted conversion rule (the control instruction conversion rule and the control data conversion rule) from the virtual UPnP device management unit 26, and stores them in the conversion rule storage unit 36.

Upon storing the UPnP description (the UPnP service description and the UPnP device description) in the UPnP description storage unit 32 and storing the conversion rule in the conversion rule storage unit 36, the virtual UPnP device processing unit 25 starts initialization processing in accordance with the UPnP standards. In other words, the virtual UPnP device processing unit 25 starts communication via the UPnP communication unit 24, and starts operation as the UPnP device. The UPnP communication unit 24 is an apparatus that conducts communication using IP used in the UPnP.

Upon receiving an acquisition request for the UPnP device description or the UPnP service description from the UPnP control point 14, the UPnP processing unit 31 in the virtual UPnP device processing unit 25 returns a response on the basis of the UPnP description stored in the UPnP description storage unit 32.

Upon receiving an access request (control instruction and control data) based on the UPnP service description from the UPnP control point 14, the UPnP processing unit 31 passes the received control instruction and control data to the UPnP→ECHONET conversion processing unit 35.

The UPnP→ECHONET conversion processing unit 35 converts the UPnP control instruction and the UPnP control data respectively to an ECHONET control instruction and ECHONET control data in accordance with the conversion rule stored in the conversion rule storage unit 36.

The UPnP→ECHONET conversion processing unit 35 sends the ECHONET control instruction and ECHONET control data obtained by the conversion to the ECHONET device via the ECHONET protocol processing unit 23.

The ECHONET→UPnP conversion processing unit 34 receives a response from the ECHONET device via the ECHONET protocol processing unit 23, and converts the response from the ECHONET device to the UPnP protocol in accordance with the conversion rule(an example of a control instruction conversion rule description and a control data conversion rule description for ECHONET UPnP conversion is not shown in a figure because they are similar to that of for UPnP ECHONET conversion (see FIG. 6, 7), and they may be included in the control instruction conversion rule description and the control data conversion rule description for UPnP→ECHONET conversion). The ECHONET→UPnP conversion processing unit 34 returns the converted response to the UPnP control point 14 via the UPnP processing unit 31 and the UPnP communication unit 24.

If an event such as a state change notice is issued from the ECHONET device and received by the ECHONET protocol processing unit 23, the event is converted to the UPnP protocol in the ECHONET→UPnP conversion processing unit 34, and subject to processing in the UPnP processing unit 31. In other words, devices on the UPnP network 13 are notified of contents of the event.

Figure 13:
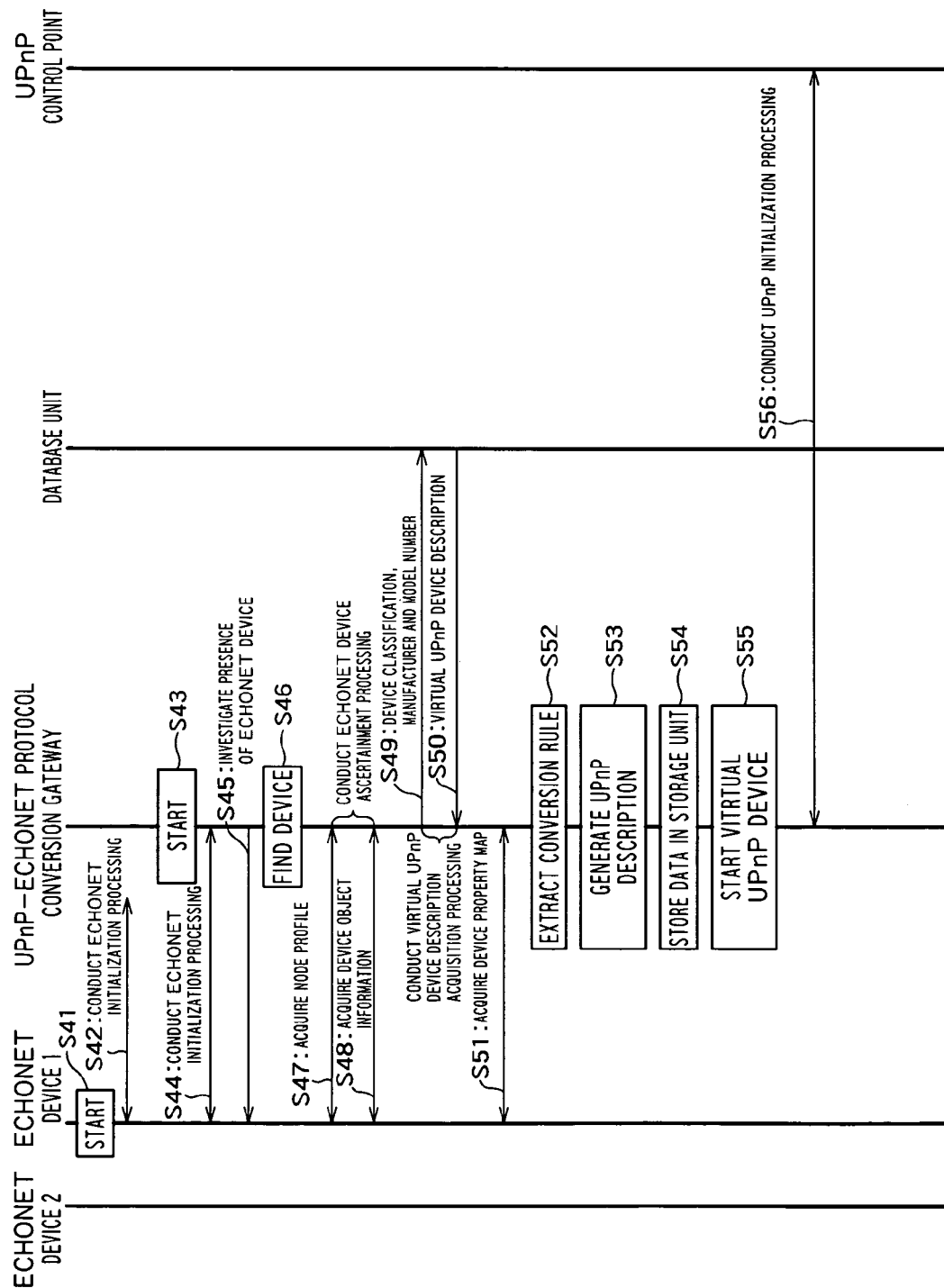
FIG. 13 is a diagram showing an example of a communication sequence conducted by a network system according to an embodiment of the present invention.

FIG. 13 is a diagram showing an example of a communication sequence conducted by the network system according to the embodiment of the present invention.

The ECHONET device 1 is first started (S41).

In the ECHONET device 1, ECHONET initialization processing defined by the ECHONET standards is conducted (S42).

Subsequently, the UPnP→ECHONET protocol conversion gateway (hereafter referred to as gateway) is started (S43).

In the gateway, ECHONET initialization processing defined by the ECHONET standards is conducted (S44).

The gateway searches for an ECHONET device already started earlier than the gateway (S45). Specifically, the gateway conducts investigation by using ECHONET broadcast. The ECHONET device 1 returns a response to the gateway in accordance with specifications of the ECHONET protocol (S45).

On the basis of this response, the gateway grasps the presence of the ECHONET device 1 started earlier (S46).

The gateway acquires ECHONET node profile information from the found ECHONET device 1, and acquires device classification information (EOJ code) of the ECHONET device from the ECHONET node profile information (S47).

In addition, the gateway acquires device object information (manufacturer information of the device and model number information) from the found ECHONET device 1 on the basis of the EOJ code (S48).

The gateway determines the device classification, manufacturer and model number acquired from the ECHONET device 1 as a retrieval key candidate, and requests the database unit to conduct retrieval (S49), and acquires a virtual UPnP device description and a UPnP device description from the database unit (S50).

Subsequently, the gateway inspects whether a control instruction or control data that does not conform to the found ECHONET device 1 is contained in a conversion rule description (control instruction conversion rule description and control data conversion rule description) in the acquired virtual UPnP device description (S51). If it is found as a result of the inspection that a control instruction or control data that does not conform to the found ECHONET device 1 is contained in the conversion rule description, the gateway deletes related control instruction information and control data information from the virtual UPnP device description. As a result, a modified virtual UPnP device description is generated.

The gateway extracts a conversion rule from the modified virtual UPnP device description (S52). The modified virtual UPnP device description obtained after the conversion rule extraction becomes a UPnP service description (S53).

The gateway stores the extracted conversion rule in the conversion rule storage unit, and stores the UPnP service description and a UPnP device description associated therewith in the UPnP description storage unit as a UPnP description (S54).

The gateway starts behavior as a virtual UPnP device on the basis of the stored conversion rule and the UPnP description (the UPnP service description and the UPnP device description), and conducts UPnP initialization processing (S56).

Figure 14:
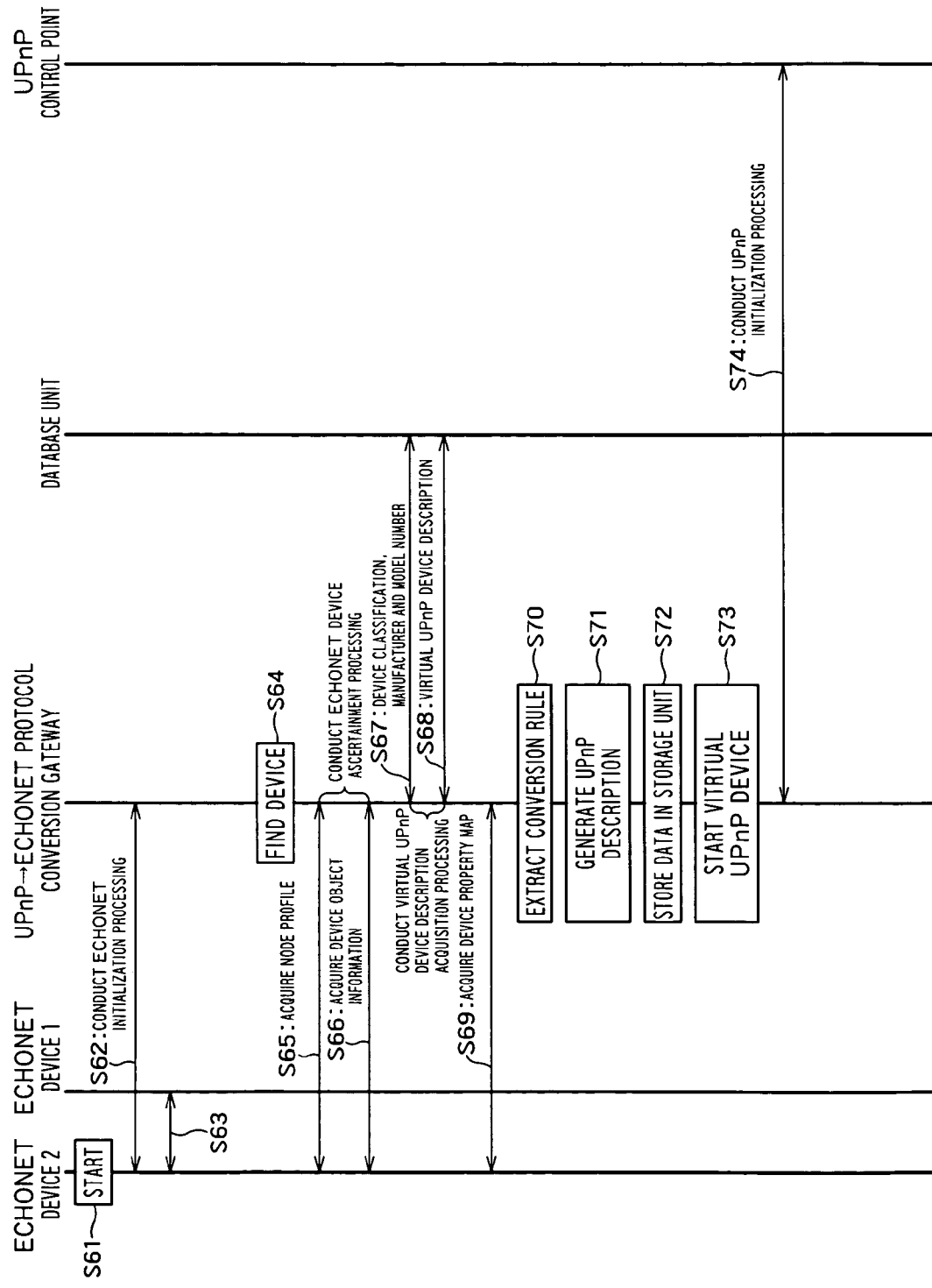
FIG. 14 is a diagram showing an example of a communication sequence following S56 shown in FIG. 13.

FIG. 14 is a diagram showing an example of the communication sequence in the case where an ECHONET device 2 is started after the S56 shown in FIG. 13.

The ECHONET device 2 is started (S61). The started ECHONET device 2 conducts ECHONET initialization processing in accordance with the ECHONET protocol (S62 and S63).

In this initialization processing, an initialization processing packet arrives at the gateway. Upon receiving the initialization processing packet, the gateway detects that the ECHONET device 2 has been started (S64).

Processing (S65 to S74) conducted after the ECHONET device 2 has been found is conducted in the same way as FIG. 13, detailed description will be omitted.

Figure 15:
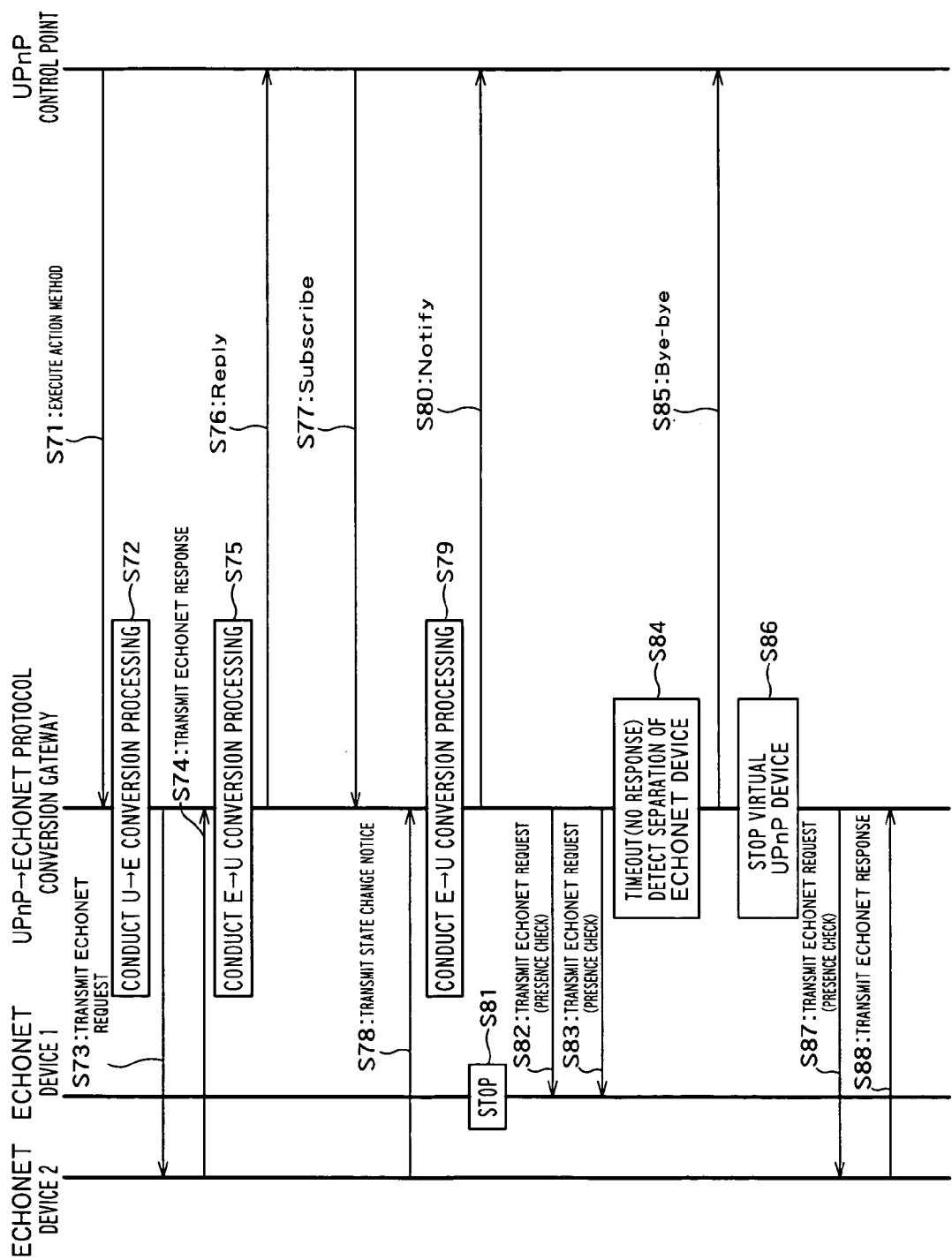
FIG. 15 is a sequence diagram showing protocol conversion processing conducted by a gateway.

FIG. 15 is a sequence diagram showing protocol conversion processing conducted by the gateway after the S74 shown in FIG. 14.

A control instruction (Action) and control data are transmitted from the UPnP control point to the gateway (S71).

Upon receiving the control instruction and the control data, the gateway converts the control instruction and control data according to the UPnP protocol to the ECHONET protocol in the UPnP→ECHONET conversion processing unit (S72). The gateway transmits the control instruction and control data according to the ECHONET protocol to the ECHONET device 2 (S73).

If the ECHONET device 2 returns a response (S74), the gateway converts the response to the UPnP protocol in the ECHONET→UPnP conversion processing unit (S75). The gateway returns a response according to the UPnP protocol to the UPnP control point (S76).

It is now supposed that the UPnP control point has issued a subscribe request to a virtual UPnP device on the gateway in order to receive an event notice (S77).

This subscribe request is converted to the ECHONET protocol in the gateway and sent to the ECHONET device 2. For example, the rule for this conversion may be previously mounted on the gateway as a basic protocol conversion rule. If a state change notice is issued from the ECHONET device 2 and it arrives at the gateway (S78), the gateway converts the state change notice to the UPnP protocol (S79), and transmits the converted state change notice to the UPnP control point as a notify notice (S80).

It is now supposed that the ECHONET device 1 has stopped (S81). An ECHONET device spontaneously stops for the purpose of power saving or the like, and stops when the user turns off power supply for a home electric appliance.

The gateway periodically issues an ECHONET request to an ECHONET device, and determines whether a response thereto is present (S82, S83 and S87). The gateway determines whether an ECHONET device is still present on the basis of whether a response is present.

Since a response from the ECHONET device 2 is present (S88), the gateway 2 judges that the ECHONET device 2 is still present on the ECHONET network. On the other hand, since a response has not been present for a definite time after the first issuance of the ECHONET request to the ECHONET device 1, the gateway judges that the absence of the ECHO- NET device 1 on the ECHONET network has occurred. In other words, the gateway detects separation of the ECHONET device 1 (S84).

Upon detecting the separation of the ECHONET device 1, the gateway stops the virtual UPnP device processing unit associated with the ECHONET device 1 (S86). Before stopping the virtual UPnP device processing unit, however, the gateway issues a separation message bye-bye to the UPnP control point 14 in accordance with the UPnP standards (S85). Upon receiving the separation message bye-bye, the UPnP control point can recognize the separation of the virtual UPnP device.

According to the present embodiment, conversion between the UPnP protocol and the ECHONET protocol is conducted using a set of the UPnP description (UPnP service description and UPnP device description) and the conversion rule (the control instruction conversion rule and the control data conversion rule), as heretofore described. Therefore, it is possible to easily cope with change and addition of the protocol conversion processing. In other words, since these data are formed as tag data in the XML form, its creating is easy. As compared with the case where a program is generated, it is possible to easily cope with change and addition in the protocol conversion processing. Therefore, it is possible to flexibly cope with appearance of new home electric appliance products and changes in service provided by home electric appliance products. It is not necessary to newly create a program for the gateway or update products. Therefore, the present invention is extremely beneficial to the users and manufactures.

According to the present embodiment, a UPnP service description and a conversion rule using tags for unique expansion are managed in a body as a virtual UPnP device description. By simply removing the conversion rule from the virtual UPnP device description, therefore, the UPnP service description can be prepared (in other words, the virtual UPnP device can be started). Furthermore, the extracted conversion rule can be used intact for the protocol conversion.

In the present embodiment heretofore described, a set of a UPnP service description and a conversion rule is handled as a virtual UPnP device description. Alternatively, a set of the UPnP service description, the conversion rule and the UPnP device description may be handled as a virtual UPnP device description.

Second Embodiment

Figure 16:
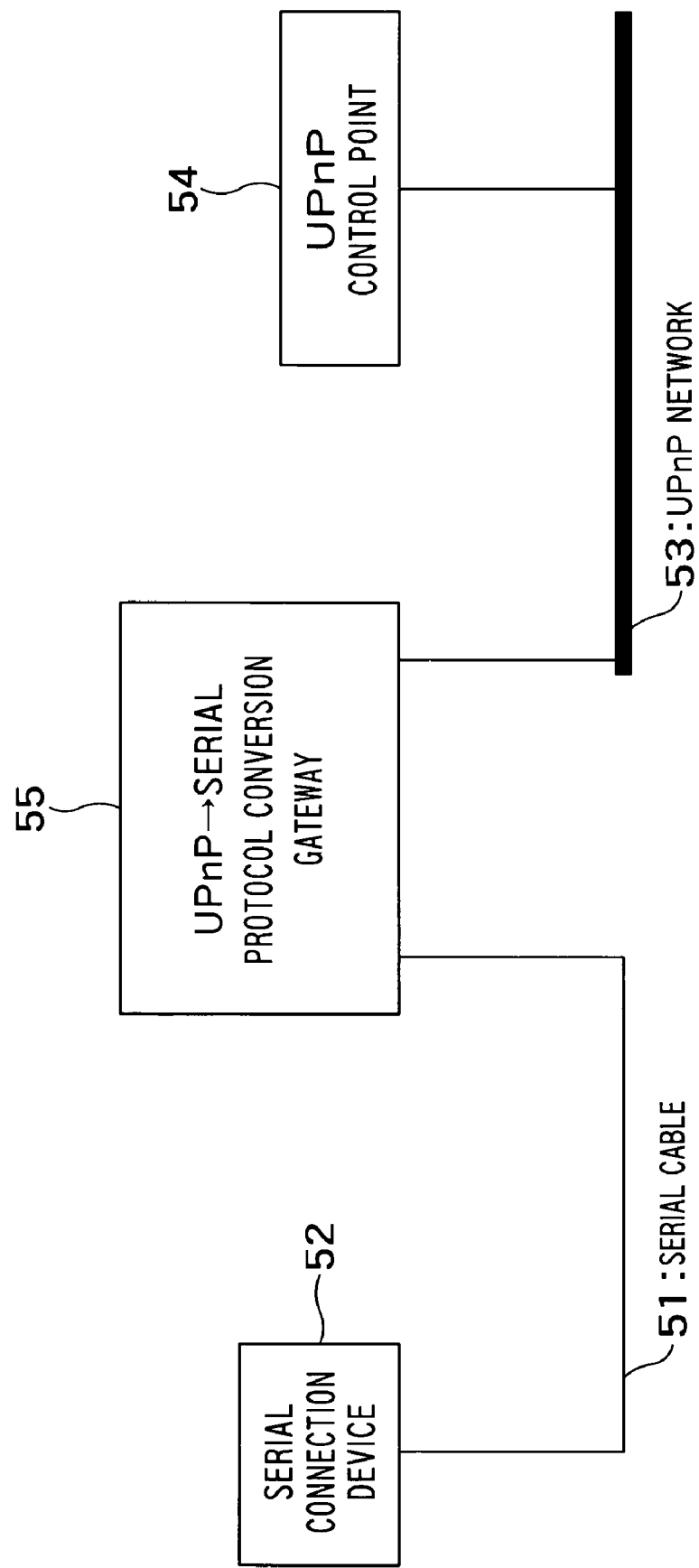
FIG. 16 is a block diagram showing an overall configuration of a network system including a UPnP—serial protocol conversion gateway according to a second embodiment of the present invention.

FIG. 16 is a block diagram showing an overall configuration of a network system including a UPnP—serial protocol conversion gateway 55 according to the present embodiment.

A UPnP control point 54 and a UPnP—serial protocol conversion gateway 55 (hereafter referred to simply as gateway 55) are connected to a UPnP network 53.

The gateway 55 and a serial connection device (control target device) 52 are connected to each other by a serial cable 51. The serial cable 51 is, for example, a UART (Universal Asynchronous Receiver Transmitter) cable or an RS232C cable.

The UPnP control point 54 controls the serial connection device 52 via the gateway 55. In other words, the UPnP control point 54 accesses service provided by the serial connection device 52 via the gateway 55.

Figure 17:
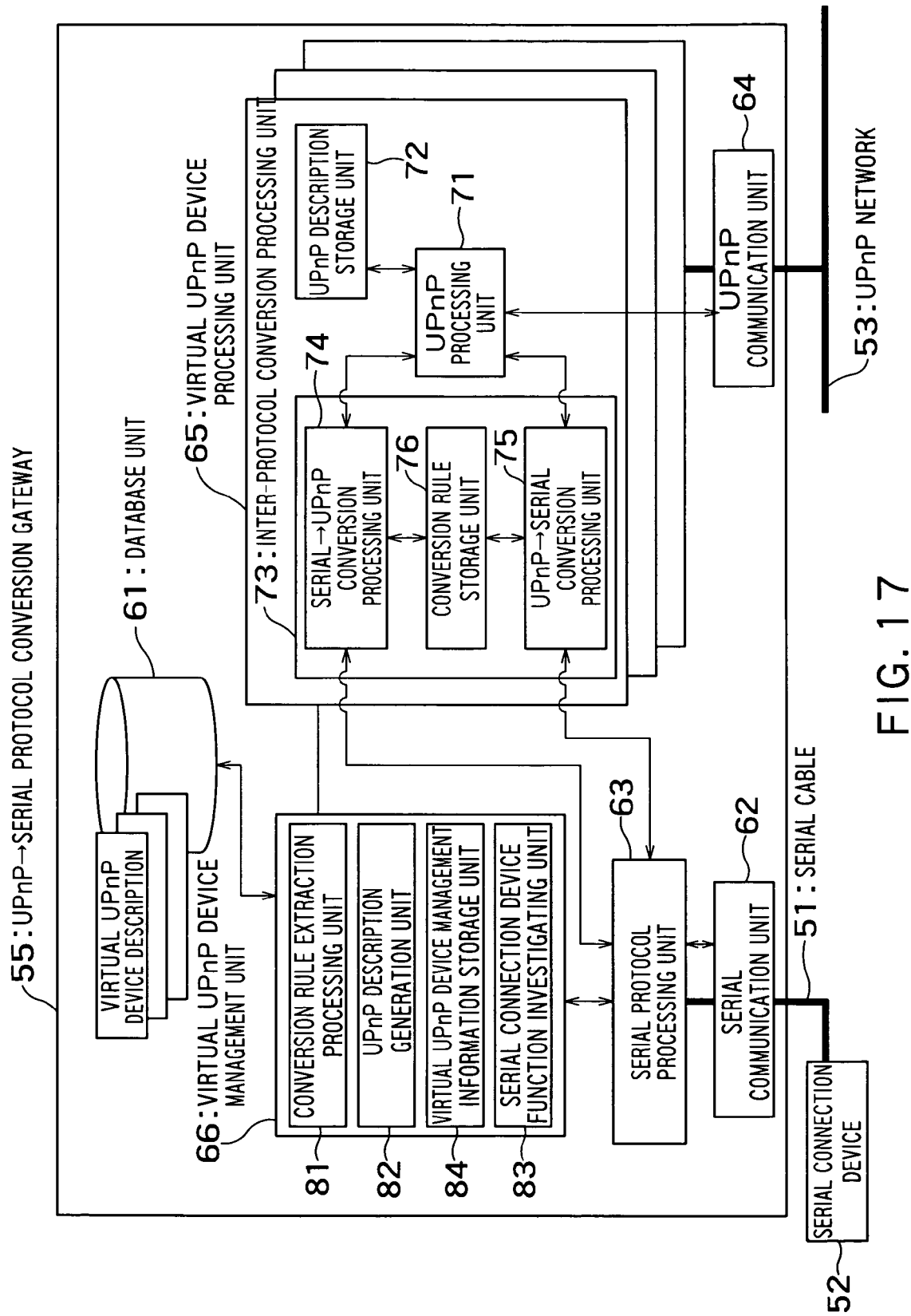
FIG. 17 is a block diagram showing an internal configuration of a UPnP—serial protocol conversion gateway.

FIG. 17 is a block diagram showing an internal configuration of the gateway 55.

This gateway 55 differs from the first embodiment mainly in that the ECHONET protocol processing unit 23 and the ECHONET communication unit 22 are replaced by a serial communication processing unit 63 and a serial communication unit 62, respectively.

The serial communication unit 62 connects the gateway 55 to the serial cable 51. The serial communication processing unit 63 communicates with the serial connection device 52 via the serial communication unit 62 in accordance with a serial communication protocol.

Other components 61, 64 to 66, 71 to 76 and 81 to 84 shown in FIG. 17 are basically the same as components in the first embodiment, and consequently detailed description of them will be omitted. The basic processing in the gateway is also the same except that the protocol is changed from the ECHONET to the serial communication protocol, and consequently detailed description thereof will be omitted.

According to the present embodiment, the same effects as those in the first embodiment can be obtained even in the case where the gateway and the control target device are connected to each other by a serial cable, i.e., the case where the gateway and the control target device conduct communication with each other in accordance with the serial communication protocol, as heretofore described.

Third Embodiment

Figure 18:
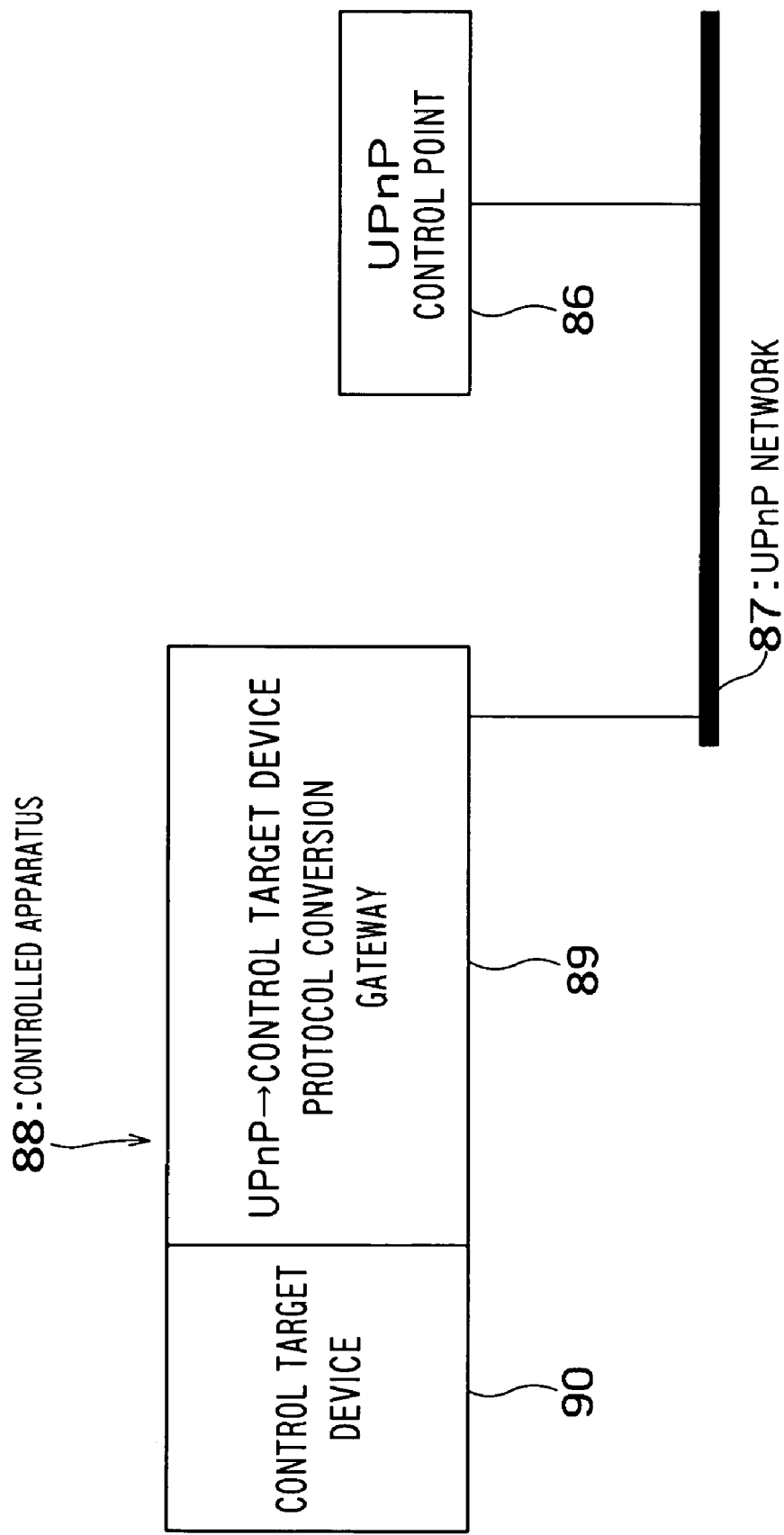
FIG. 18 is a block diagram showing an overall configuration of a network system including a controlled apparatus according to a third embodiment of the present invention.

FIG. 18 is a block diagram showing an overall configuration of a network system including a controlled apparatus (communication apparatus) 88 according to the present embodiment.

A UPnP control point (access apparatus) 86 and a controlled apparatus 88 are connected to a UPnP network 87.

The controlled apparatus 88 includes a UPnP→control target device protocol conversion gateway 89 (hereafter referred to simply as gateway 89) and a control target device 90. In the first embodiment, the gateway and the control target device (ECHONET device) are connected to each other via the network. In the present embodiment, however, the gateway and the control target device are formed as one body.

The UPnP control point 86 controls the control target device 90 via the gateway 89. In other words, the UPnP control point 86 accesses service provided by the control target device 90, via the gateway 89.

Figure 19:
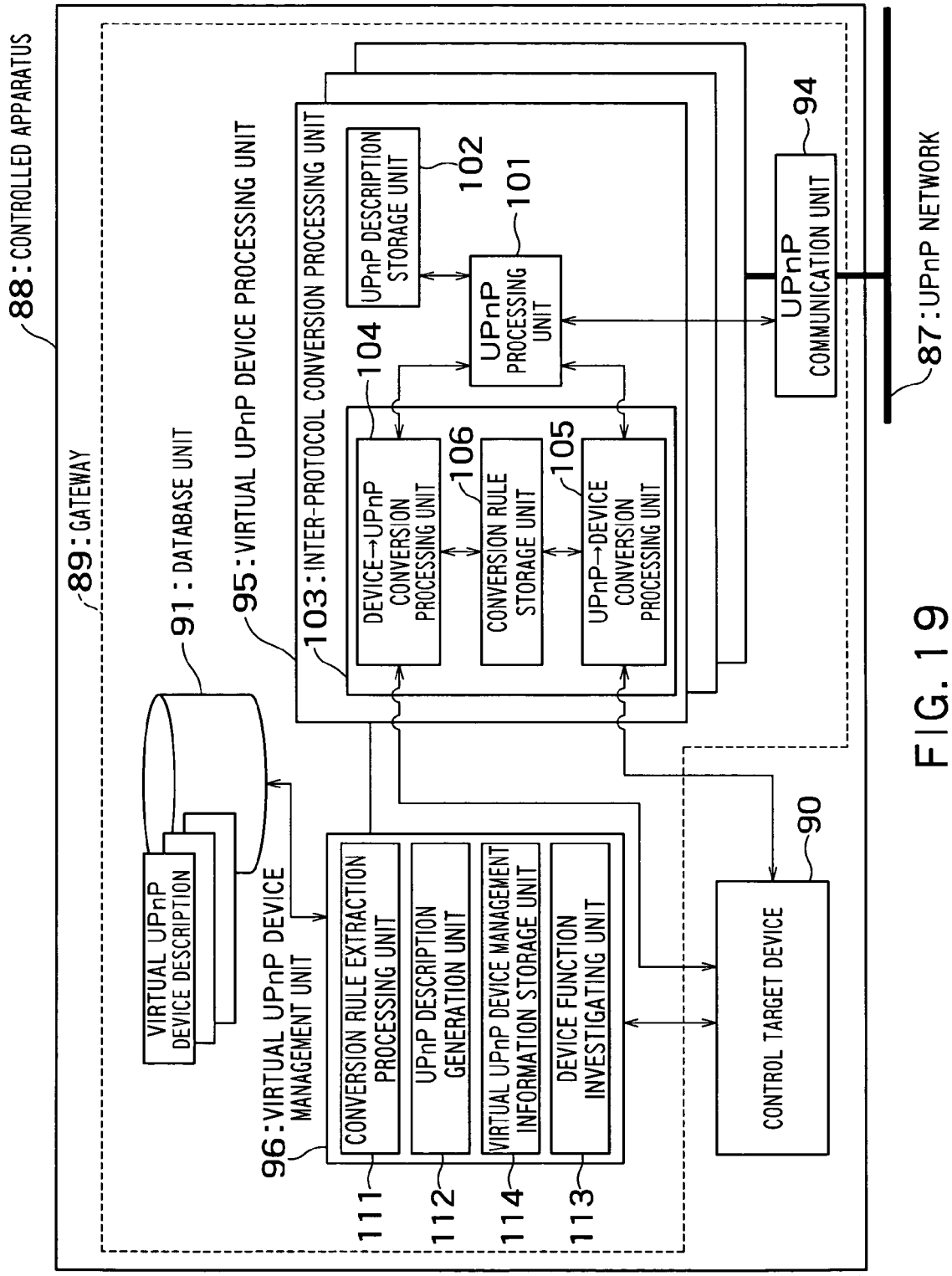
FIG. 19 is a block diagram showing an internal configuration of a controlled apparatus.

FIG. 19 is a block diagram showing an internal configuration of the Controlled apparatus 88.

The gateway 89 and the control target device 90 are connected to each other directly or by a bus. Components 91, 94 to 96, 101 to 106 and 111 to 114 included in the gateway 89 are basically the same as the components in the first embodiment, and consequently detailed description of them will be omitted. However, the processing corresponding to the ECHONET protocol processing unit 23 and the ECHONET communication unit 22 shown in FIG. 2 are conducted by a virtual UPnP device processing unit 95. The basic processing in the gateway 89 is also the same as that in the first embodiment, and consequently detailed description thereof will be omitted.

According to the present embodiment, the same effects as those in the first embodiment can be obtained even in the case where the gateway and the control target device are connected to each other directly or by a bus.

Fourth Embodiment

Figure 20:
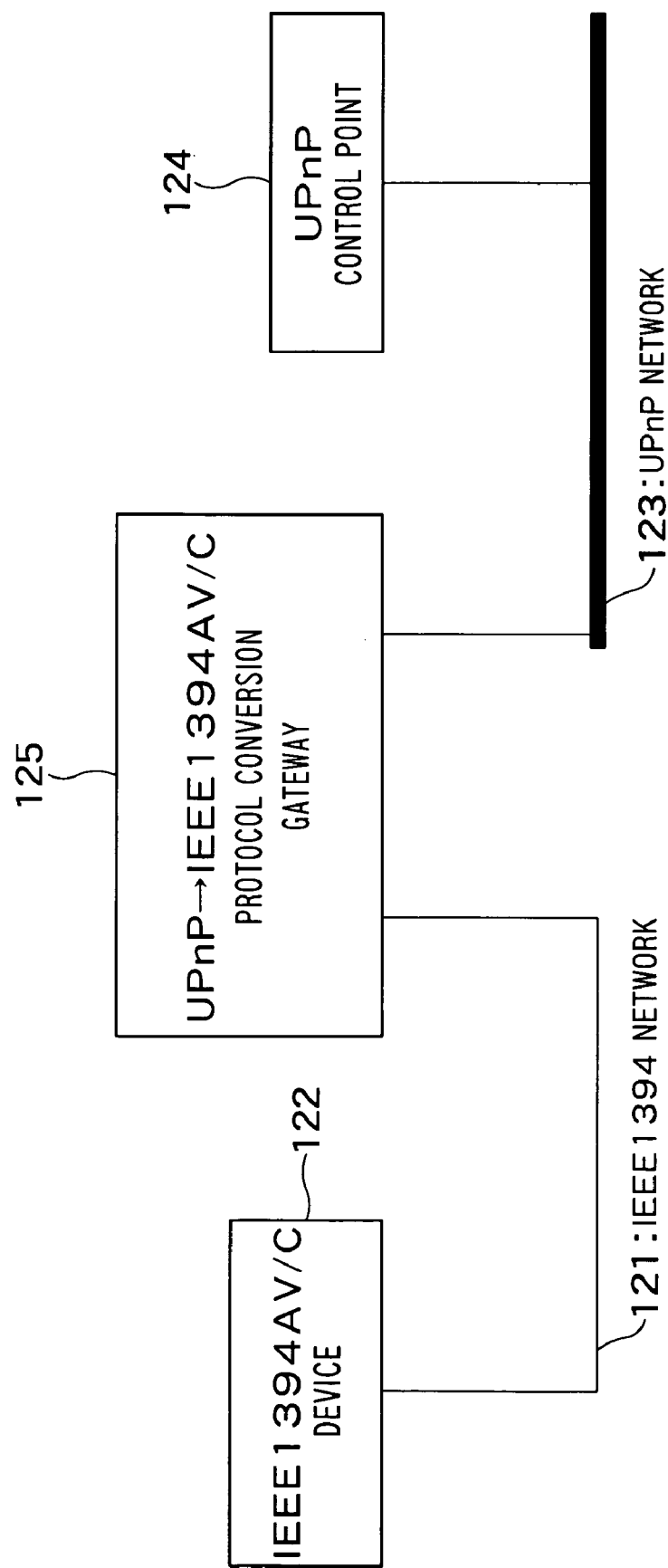
FIG. 20 is a block diagram showing an overall configuration of a network system including a UPnP—IEEE 1394 protocol conversion gateway according to a fourth embodiment of the present invention.

FIG. 20 is a block diagram showing an overall configuration of a network system including a UPnP→IEEE 1394 AV/C protocol conversion gateway 125 according to the present embodiment.

A UPnP control point 124 and a UPnP→IEEE 1394 AV/C protocol conversion gateway 125 (hereafter referred to simply as gateway 125) are connected to a UPnP network 123.

An IEEE 1394 AV/C device 122 and the gateway 125 are connected to an IEEE 1394 network 121.

The UPnP control point 124 controls the IEEE 1394 AV/C device 122 via the gateway 125. In other words, the UPnP control point 124 accesses service provided by the IEEE 1394 AV/C device 122, via the gateway 125.

Figure 21:
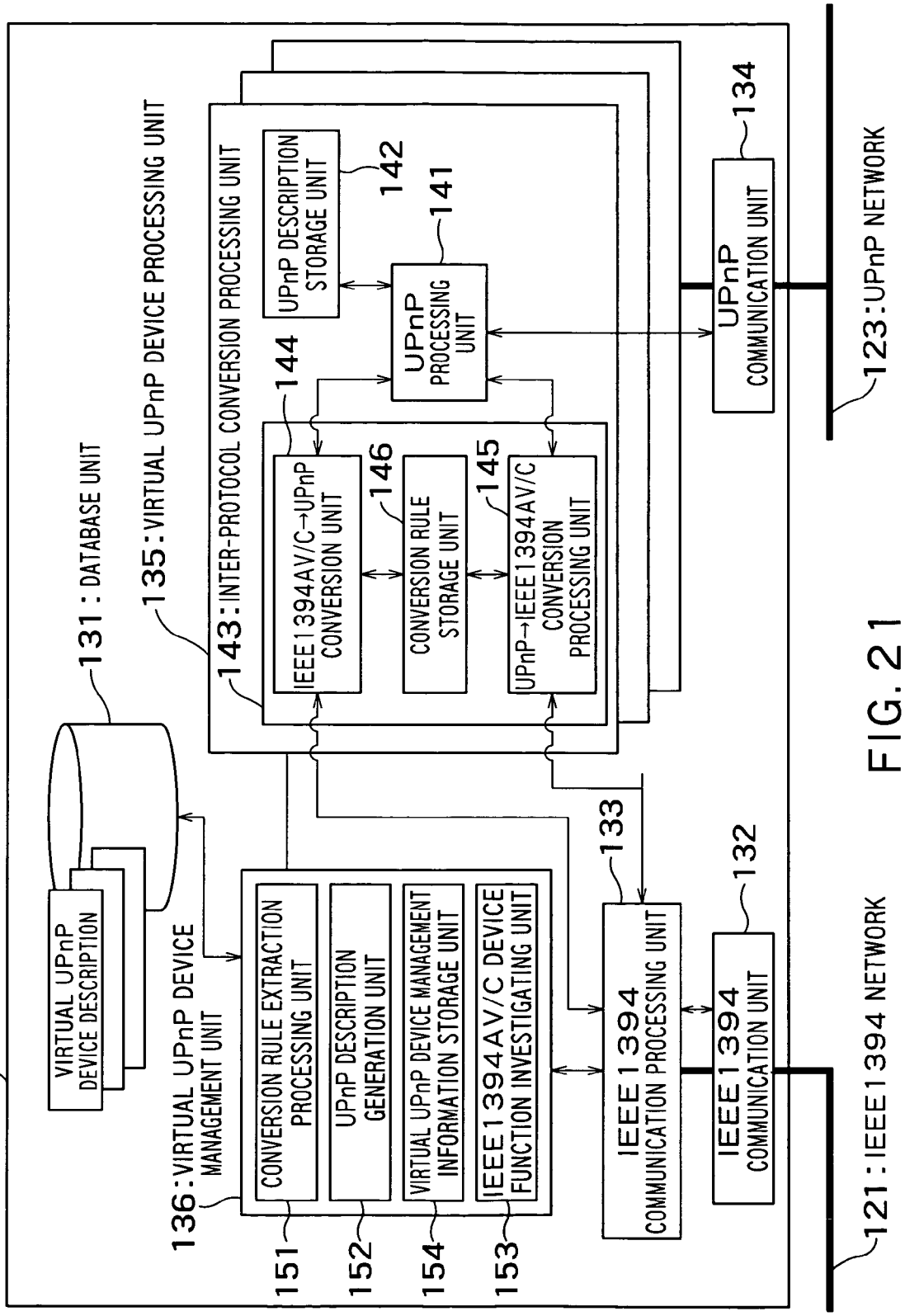
FIG. 21 is a block diagram showing an internal configuration of a UPnP—IEEE 1394 AV/C protocol conversion gateway.

FIG. 21 is a block diagram showing an internal configuration of the UPnP→IEEE 1394 AV/C protocol conversion gateway 125.

This gateway 125 differs from the first embodiment mainly in that the ECHONET protocol processing unit 23 and the ECHONET communication unit 22 are replaced by an IEEE 1394 communication processing unit 133 and an IEEE 1394 communication unit 132, respectively. Other components 131, 134 to 136, 141 to 146 and 151 to 154 are basically the same as components in the first embodiment, and consequently detailed description of them will be omitted. The basic processing in the gateway 125 is also the same as that in the first embodiment except that the protocol is changed from the ECHONET to the IEEE 1394 AV/C, and consequently detailed description thereof will be omitted.

According to the present embodiment, the same effects as those in the first embodiment can be obtained even in the case where the gateway and the control target device conduct communication with each other in accordance with the IEEE 1394 AV/C communication protocol, as heretofore described.

What is claimed is:

1. A protocol conversion apparatus for mediating access from a first communication device executing a first protocol on a first network to a second communication device executing a second protocol on a second network, comprising:
   a first protocol processing unit configured to execute the first protocol;
   a second protocol processing unit configured to execute the second protocol;
   a database unit configured to store service descriptions, each describing at least one service provided by a second communication device on the second network in accordance with a specification of the first protocol, and to store conversion rule descriptions, each describing at least one protocol conversion rule from the first protocol to the second protocol associated with the at least one service, the service descriptions and the conversion rule descriptions each being associated with at least one of device classification information, manufacturer information and model number information;
   a detection unit configured to detect a second communication device on the second network;
   an information acquisition unit configured to acquire detailed information of the detected second communication device from the detected second communication device, the detailed information including device classification information, manufacturer information and model number information,
   a database retrieval unit configured to, according to prioritized ordering of all or some of device classification information, manufacturer information, model number information and combinations of them, produce one or more retrieval keys based on the detailed information and sequentially use the retrieval keys to search the database unit and retrieve from the database unit respective ones of the service descriptions and the conversion rule descriptions associated with a matched one of the retrieval keys;
   a virtual processing unit configured to conduct processing of behaving as if providing a first communication device on the first network with the at least one service described in the retrieved service description, by using the first protocol processing unit, and to receive an access request to the service from the first communication device on the first network;
   a conversion unit configured to convert the access request received by the virtual processing unit to an access request of the second protocol, on the basis of the protocol conversion rule described in the retrieved conversion rule description; and
   an access request transmission unit configured to transmit the converted access request to the detected second communication device on the second network, wherein
   the conversion rule descriptions each include:
      a first control instruction described in conformity to the first protocol;
      a second control instruction described in conformity to the second protocol, the second control instruction corresponding to the first control instruction and representing the same instruction content as that of the first control instruction;
      first control data described in conformity to the first protocol and comprising control data capable of being used by the first control instruction; and
      second control data described in conformity to the second protocol and comprising control data capable of being used by the second control instruction, the second control data corresponding to the first control data and representing the same data content as the first control data, and wherein
   the conversion rule descriptions are each described in tag form such that the first control instruction, the second control instruction, the first control data and the second control data each is surrounded with correspondingly defined tags,
   the access request transmitted from the first communication device includes a first control instruction and first control data in conformity to the first protocol,
   the conversion unit
      detects from the retrieved conversion rule description a second control instruction corresponding to the first control instruction included in the access request, and
      detects from the retrieved conversion rule description second control data corresponding to the first control data included in the access request, and
   the converted access request includes the detected second control instruction and the detected second control data.

2. The protocol conversion apparatus according to claim 1, further comprising:
   a receiving unit configured to receive an access response to the converted access request, from the detected second communication device on the second network;
   an inverse conversion unit configured to convert the access response to the first protocol on the basis of the protocol conversion rule in the retrieved conversion rule description; and
   an access response transmitting unit configured to transmit the converted access response to the first communication device on the first network.

3. The protocol conversion apparatus according to claim 1, wherein
   the database unit stores the service descriptions and the conversion rule descriptions in a body as virtual device descriptions, respectively, each virtual device description being associated with the at least one of device classification information, manufacturer information and model number information, the database retrieval unit searches the database to retrieve one of the virtual device descriptions, the protocol conversion apparatus further comprises a separation unit which separates the virtual device description retrieved from the database unit into the service description and the conversion rule description and which passes the separated service description to the virtual processing unit and passes the separated conversion rule description to the conversion unit.

4. The protocol conversion apparatus according to claim 1, further comprising an inspection unit configured to inspect whether the detected second communication device conforms to the at least one protocol conversion rule described in the conversion rule description retrieved by the database retrieval unit and, if a protocol conversion rule that does not conform to the detected second communication device is described in the conversion rule description, delete the protocol conversion rule from the conversion rule description and description of service relating to the deleted protocol conversion rule from the service description.

5. The protocol conversion apparatus according to claim 1, further comprising:
a download unit configured to download data from an external server, the data including
a service description or a conversion rule description, and
at least one of device classification information, manufacturer information and model number information; and
an update unit configured to update the database unit on the basis of the downloaded data.

6. The protocol conversion apparatus according to claim 1, wherein if separation of the detected second communication device from the second network is detected by the detection unit, the virtual processing unit terminates the processing of behaving for the separated second communication device.

7. The protocol conversion apparatus according to claim 1, wherein the first protocol is the UPnP protocol.

8. The protocol conversion apparatus according to claim 1, wherein the second protocol is ECHONET protocol, serial communication protocol, or IEEE 1394 AV/C protocol.

9. A method executed in an apparatus which mediates access from a first communication device executing a first protocol on a first network to a second communication device executing a second protocol on a second network, comprising:
accessing a database unit configured to store service descriptions each describing at least one service provided by a second communication device on the second network in accordance with a specification of the first protocol and conversion rule descriptions each describing at least one protocol conversion rule from the first protocol to the second protocol associated with the at least one service, the service descriptions and the conversion rule descriptions each being associated with at least one of device classification information, manufacturer information and model number information;
detecting a second communication device on the second network;
acquiring detailed information of the detected second communication device from the detected second communication device, the detailed information including device classification information, manufacturer information and model number information;
according to prioritized ordering of all or some of device classification information, manufacturer information, model number information and combinations of them, producing one or more retrieval keys based on the detailed information and sequentially using the retrieval keys to search the database unit, and retrieve from the database unit respective ones of the service descriptions and the conversion rule descriptions associated with a matched one of the retrieval keys;
conducting processing of behaving in accordance with the first protocol as if providing the first communication device on the first network with the at least one service described in the retrieved service description;
upon receiving an access request to the service from the first communication device on the first network, converting the received access request to an access request of the second protocol on the basis of the protocol conversion rule described in retrieved conversion rule description; and
transmitting the converted access request to the detected second communication device on the second network, wherein
the conversion rule descriptions each include:
a first control instruction described in conformity to the first protocol;
a second control instruction described in conformity to the second protocol, the second control instruction corresponding to the first control instruction and representing the same instruction content as that of the first control instruction;
first control data described in conformity to the first protocol and comprising control data capable of being used by the first control instruction; and
second control data described in conformity to the second protocol and comprising control data capable of being used by the second control instruction, the second control data corresponding to the first control data and representing the same data content as the first control data, and wherein
the conversion rule descriptions are each described in tag form such that the first control instruction, the second control instruction, the first control data and the second control data each is surrounded with correspondingly defined tags,
the access request transmitted from the first communication device includes a first control instruction and first control data in conformity to the first protocol,
the converting of the received access request includes
detecting from the retrieved conversion rule description a second control instruction corresponding to the first control instruction included in the access request, and
detecting from the retrieved conversion rule description second control data corresponding to the first control data included in the access request, and
the converted access request includes the detected second control instruction and the detected second control data.

10. The apparatus according to claim 1, wherein
the service descriptions and the conversion rule descriptions in the database unit each are associated with either one of a combination of device classification information, manufacturer information and model number information, a combination of device classification information and manufacturer information or device classification information; and
the prioritized ordering is provided in order of a combination of device classification information, manufacturer information and model number information, a combination of device classification information and manufacturer information and device classification information.

11. A protocol conversion apparatus for mediating access from a first communication device executing a first protocol on a first network to a second communication device executing a second protocol on a second network, the protocol conversion apparatus comprising:
- a first protocol processing unit configured to execute the first protocol;
- a second protocol processing unit configured to execute the second protocol;
- a database unit configured to store service descriptions, each service description describing at least one service provided by a second communication device on the second network in accordance with a specification of the first protocol, and to store conversion rule descriptions, each conversion rule description describing at least one protocol conversion rule from the first protocol to the second protocol associated with the at least one service, the service descriptions and the conversion rule descriptions each being associated with at least one of device classification information, manufacturer information and model number information;
- a device management unit configured to acquire detailed information of a second communication device detected to be on the second communication network, the detailed information including one or more of device classification information, manufacturer information and model number information,
- the device management unit being further configured to generate one or more retrieval keys based on prioritized orderings of all or some of device classification information, manufacturer information, model number information and combinations thereof, and to sequentially use the generated retrieval keys to search the database unit and retrieve from the database unit respective ones of the service descriptions and the conversion rule descriptions corresponding to a matched one of the retrieval keys;
- a virtual processing unit configured to receive from the first communication device on the first network an access request to the at least one service described in the retrieved service description, and to convert the received access request to an access request of the second protocol, for transmission to the detected second communication device, on the basis of the protocol conversion rule described in the retrieved conversion rule description, wherein the conversion rule descriptions each include:
- a first control instruction described in conformity to the first protocol;
- a second control instruction described in conformity to the second protocol, the second control instruction corresponding to the first control instruction and representing the same instruction content as that of the first control instruction;
- first control data described in conformity to the first protocol and comprising control data capable of being used by the first control instruction; and
- second control data described in conformity to the second protocol and comprising control data capable of being used by the second control instruction, the second control data corresponding to the first control data and representing the same data content as the first control data, and wherein the conversion rule descriptions are each described in tag form such that the first control instruction, the second control instruction, the first control data and the second control data each is surrounded with correspondingly defined tags, the access request transmitted from the first communication device includes a first control instruction and first control data in conformity to the first protocol, the virtual processing unit
- detects from the retrieved conversion rule description a second control instruction corresponding to the first control instruction included in the access request, and
- detects from the retrieved conversion rule description second control data corresponding to the first control data included in the access request, and the converted access request includes the detected second control instruction and the detected second control data.

* * * * *